United States Patent
Regan et al.

(10) Patent No.: US 10,194,716 B2
(45) Date of Patent: *Feb. 5, 2019

(54) AUTOMATED IDENTIFICATION AND ASSEMBLY OF SHOE PARTS

(71) Applicant: NIKE, Inc., Beaverton, OR (US)

(72) Inventors: Patrick Conall Regan, Taichung (TW); Kuo-Hung Lee, Douliu (TW); Chih-Chi Chang, Douliu (TW); Ming-Feng Jean, Douliu (TW); Chang-Chu Liao, Douliu (TW)

(73) Assignee: NIKE, Inc., Beaverton, OR (US)

( * ) Notice: Subject to any disclaimer, the term of this patent is extended or adjusted under 35 U.S.C. 154(b) by 249 days.

This patent is subject to a terminal disclaimer.

(21) Appl. No.: 14/803,347

(22) Filed: Jul. 20, 2015

(65) Prior Publication Data

US 2015/0374073 A1    Dec. 31, 2015

Related U.S. Application Data

(63) Continuation of application No. 14/267,503, filed on May 1, 2014, now Pat. No. 9,084,451, which is a
(Continued)

(51) Int. Cl.
*G06F 19/00* (2018.01)
*A43D 86/00* (2006.01)
(Continued)

(52) U.S. Cl.
CPC ............... *A43D 86/00* (2013.01); *A43D 1/08* (2013.01); *A43D 11/00* (2013.01); *A43D 95/00* (2013.01); *A43D 111/00* (2013.01); *A43D 111/006* (2013.01); *A43D 117/00* (2013.01); *A43D 119/00* (2013.01); *B25J 9/1687* (2013.01); *B29C 65/08* (2013.01); *B29C 65/7802* (2013.01); *B29C 65/7847* (2013.01);
(Continued)

(58) Field of Classification Search
None
See application file for complete search history.

(56) References Cited

U.S. PATENT DOCUMENTS 4,041,620 A    8/1977    Anderson
4,452,057 A    6/1984    Davies et al.
(Continued)

FOREIGN PATENT DOCUMENTS

CA    2790521 A1    9/2011
CA    2791913 A1    9/2011
(Continued)

OTHER PUBLICATIONS

International Search Report with Written Opinion dated Jan. 30, 2015 in PCT Application No. PCT/US2014/059929, 92 pages.
(Continued)

*Primary Examiner* — Ronald D Hartman, Jr.
(74) *Attorney, Agent, or Firm* — Shook, Hardy & Bacon L.L.P.

(57) ABSTRACT

Manufacturing and assembly of a shoe or a portion of a shoe is enhanced by automated placement and assembly of shoe parts. For example, a part-recognition system analyzes an image of a shoe part to identify the part and determine a location of the part. Once the part is identified and located, the part can be manipulated by an automated manufacturing tool.

20 Claims, 24 Drawing Sheets

Related U.S. Application Data continuation of application No. 13/299,872, filed on Nov. 18, 2011, now Pat. No. 8,755,925.

(51) Int. Cl.

| | |
|---|---|
| *A43D 11/00* | (2006.01) |
| *A43D 95/00* | (2006.01) |
| *A43D 111/00* | (2006.01) |
| *A43D 117/00* | (2006.01) |
| *A43D 119/00* | (2006.01) |
| *A43D 1/08* | (2006.01) |
| *B25J 9/16* | (2006.01) |
| *G05B 19/4099* | (2006.01) |
| *B29C 65/08* | (2006.01) |
| *B29C 65/78* | (2006.01) |
| *B29C 65/00* | (2006.01) |
| *G06T 7/73* | (2017.01) |
| *B29L 31/50* | (2006.01) |

(52) U.S. Cl.
CPC ........ *B29C 66/1122* (2013.01); *B29C 66/472* (2013.01); *B29C 66/8161* (2013.01); *B29C 66/8167* (2013.01); *B29C 66/863* (2013.01); *B29C 66/9672* (2013.01); *G05B 19/4099* (2013.01); *G06T 7/73* (2017.01); *A43D 2200/10* (2013.01); *A43D 2200/30* (2013.01); *A43D 2200/50* (2013.01); *A43D 2200/60* (2013.01); *B29C 66/71* (2013.01); *B29C 66/727* (2013.01); *B29C 66/729* (2013.01); *B29C 66/7392* (2013.01); *B29C 66/7484* (2013.01); *B29L 2031/50* (2013.01); *B29L 2031/505* (2013.01); *F04C 2270/0421* (2013.01); *G05B 2219/37205* (2013.01); *G05B 2219/37555* (2013.01); *G05B 2219/39107* (2013.01); *G05B 2219/45243* (2013.01); *G06K 2209/19* (2013.01); *G06T 2207/30108* (2013.01)

(56) References Cited

U.S. PATENT DOCUMENTS

| | | |
|---|---|---|
| 4,639,963 A | 2/1987 | Fisher |
| 4,671,755 A | 6/1987 | Graae et al. |
| 4,803,735 A | 2/1989 | Nishida et al. |
| 4,866,802 A | 9/1989 | Stein |
| 4,996,012 A | 2/1991 | Gierschewski et al. |
| 5,027,281 A | 6/1991 | Rekow et al. |
| 5,105,564 A | 4/1992 | Motoda |
| 5,218,427 A | 6/1993 | Koch |
| 5,231,470 A | 7/1993 | Koch |
| 5,255,352 A | 10/1993 | Falk et al. |
| 5,259,468 A | 11/1993 | Warren et al. |
| 5,377,011 A | 12/1994 | Koch |
| 5,506,682 A | 4/1996 | Pryor |
| 5,608,847 A | 3/1997 | Pryor |
| 5,671,055 A | 9/1997 | Whittlesey et al. |
| 5,768,732 A | 6/1998 | Blanc |
| 5,784,737 A | 7/1998 | Tsuji |
| 5,807,449 A | 9/1998 | Hooker et al. |
| 5,819,016 A | 10/1998 | Watanabe et al. |
| 5,836,428 A | 11/1998 | Young |
| 5,920,395 A | 7/1999 | Schulz et al. |
| 6,009,359 A | 12/1999 | El-Hakim et al. |
| 6,051,028 A | 4/2000 | McCartney et al. |
| 6,098,313 A | 8/2000 | Skaja |
| 6,301,763 B1 | 10/2001 | Pryor |
| 6,438,780 B1 | 8/2002 | Hansen et al. |
| 6,473,667 B1 | 10/2002 | Lee |
| 6,533,885 B2 | 3/2003 | Davis et al. |
| 6,599,381 B2 | 7/2003 | Urlaub et al. |
| 6,611,617 B1 | 8/2003 | Crampton |
| 6,721,444 B1 | 4/2004 | Gu et al. |
| 6,765,572 B2 | 7/2004 | Roelofs |
| 6,779,032 B1 | 8/2004 | Hericourt |
| 6,816,755 B2 | 11/2004 | Habibi et al. |
| 6,867,772 B2 | 3/2005 | Kotcheff et al. |
| 6,900,450 B2 | 5/2005 | Gimenez et al. |
| 6,952,204 B2 | 10/2005 | Baumberg et al. |
| 7,065,242 B2 | 6/2006 | Petrov et al. |
| 7,079,114 B1 | 7/2006 | Smith et al. |
| 7,204,043 B2 | 4/2007 | Kilgore |
| 7,446,733 B1 | 11/2008 | Hirimai |
| 7,620,235 B2 | 11/2009 | Daniel |
| 7,657,100 B2 | 2/2010 | Gokturk et al. |
| 7,881,896 B2 | 2/2011 | Atwell et al. |
| 8,005,558 B2 | 8/2011 | Waatti et al. |
| 8,035,052 B2 | 10/2011 | De La Ballina et al. |
| 8,107,721 B2 | 1/2012 | Beardsley et al. |
| 8,143,494 B2 | 3/2012 | Eby |
| 8,220,335 B2 | 7/2012 | Dubois et al. |
| 8,233,667 B2 | 7/2012 | Helgason et al. |
| 8,545,743 B2 | 10/2013 | Spanks et al. |
| 8,849,620 B2 | 9/2014 | Regan et al. |
| 8,966,775 B2 | 3/2015 | Regan et al. |
| 9,237,780 B2 | 1/2016 | Jurkovic et al. |
| 9,339,079 B2 | 5/2016 | Lucas et al. |
| 9,451,810 B2 | 9/2016 | Regan et al. |
| 9,668,545 B2 | 6/2017 | Jurkovic et al. |
| 2001/0010249 A1 | 8/2001 | McNichols |
| 2001/0042321 A1 | 11/2001 | Tawney et al. |
| 2001/0045755 A1 | 11/2001 | Schick et al. |
| 2002/0024677 A1 | 2/2002 | Metcalfe |
| 2002/0193909 A1 | 12/2002 | Parker et al. |
| 2003/0038822 A1 | 2/2003 | Raskar |
| 2003/0062110 A1 | 4/2003 | Urlaub et al. |
| 2003/0139848 A1 | 7/2003 | Cifra et al. |
| 2003/0231793 A1 | 12/2003 | Crampton |
| 2003/0231797 A1 | 12/2003 | Cullen et al. |
| 2004/0022426 A1 | 2/2004 | Carbone, II et al. |
| 2004/0172164 A1 | 9/2004 | Habibi et al. |
| 2005/0135670 A1 | 6/2005 | Vaidyanathan |
| 2005/0154485 A1 | 7/2005 | Popp et al. |
| 2006/0041448 A1 | 2/2006 | Patterson et al. |
| 2006/0143839 A1 | 7/2006 | Fromme |
| 2006/0155417 A1 | 7/2006 | Cremaschi |
| 2006/0221072 A1 | 10/2006 | Se et al. |
| 2006/0266593 A1 | 11/2006 | Cerreto et al. |
| 2008/0139126 A1 | 6/2008 | Lee et al. |
| 2008/0147219 A1 | 6/2008 | Jones et al. |
| 2008/0189194 A1 | 8/2008 | Bentvelzen |
| 2008/0192263 A1 | 8/2008 | Wienand et al. |
| 2010/0036753 A1 | 2/2010 | Harvill et al. |
| 2010/0149178 A1 | 6/2010 | Yokoyama et al. |
| 2010/0238271 A1 | 9/2010 | Pfeiffer et al. |
| 2010/0243030 A1 | 9/2010 | Yago |
| 2011/0000299 A1 | 1/2011 | Isobe et al. |
| 2011/0061265 A1 | 3/2011 | Lyden |
| 2011/0166694 A1 | 7/2011 | Griffits et al. |
| 2011/0172797 A1 | 7/2011 | Jones et al. |
| 2011/0232008 A1 | 9/2011 | Crisp |
| 2011/0264138 A1 | 10/2011 | Avelar et al. |
| 2011/0292406 A1 | 12/2011 | Hollenbeck et al. |
| 2012/0059517 A1 | 3/2012 | Nomura |
| 2012/0287253 A1 | 11/2012 | Makover et al. |
| 2013/0030773 A1 | 1/2013 | O'Hare |
| 2013/0111731 A1 | 5/2013 | Onishi |
| 2013/0131865 A1 | 5/2013 | Yamane |
| 2013/0132038 A1 | 5/2013 | Regan et al. |
| 2014/0081441 A1 | 3/2014 | Regan et al. |
| 2014/0096403 A1 | 4/2014 | Regan et al. |
| 2014/0196307 A1 | 7/2014 | Fremming et al. |
| 2015/0135447 A1 | 5/2015 | Jurkovic et al. |
| 2015/0298320 A1 | 10/2015 | Eisele et al. |
| 2017/0105490 A1 | 4/2017 | Makover et al. |
| 2017/0308066 A1 | 10/2017 | Farren et al. |

FOREIGN PATENT DOCUMENTS

| | | |
|---|---|---|
| CN | 85108140 A | 4/1986 |
| CN | 1293752 A | 5/2001 |

(56) References Cited

FOREIGN PATENT DOCUMENTS

| | | | |
|---|---|---|---|
| CN | 1753611 | A | 3/2006 |
| CN | 1831687 | A | 9/2006 |
| CN | 2865565 | Y | 2/2007 |
| CN | 101161151 | A | 4/2008 |
| CN | 101339640 | A | 1/2009 |
| CN | 201349600 | A | 11/2009 |
| CN | 101847173 | A | 9/2010 |
| CN | 102076269 | A | 5/2011 |
| CN | 102157013 | A | 8/2011 |
| DE | 4020358 | C1 | 8/1991 |
| DE | 10343620 | A1 | 4/2005 |
| EP | 0123173 | A2 | 3/1988 |
| EP | 348311 | A1 | 12/1989 |
| EP | 0512773 | A1 | 11/1992 |
| EP | 0572123 | A2 | 12/1993 |
| EP | 0689778 | A1 | 1/1996 |
| EP | 0422946 | B1 | 6/1996 |
| EP | 0780065 | A1 | 6/1997 |
| EP | 0840880 | B1 | 3/2002 |
| EP | 1544800 | A2 | 6/2005 |
| EP | 0790010 | A1 | 4/2011 |
| ES | 2142239 | A1 | 4/2000 |
| FR | 2911255 | A1 | 7/2008 |
| GB | 699299 | A | 11/1953 |
| GB | 2140345 | A | 11/1984 |
| JP | H06195823 | A | 7/1994 |
| JP | 2002217251 | A | 8/2002 |
| JP | 2011143497 | A | 7/2011 |
| TW | 486614 | B | 5/2002 |
| TW | 201017092 | A | 5/2010 |
| TW | 201128569 | A | 8/2011 |
| WO | 9111885 | A1 | 8/1991 |
| WO | 09727451 | A1 | 7/1997 |
| WO | 99055186 | A1 | 11/1999 |
| WO | 0036943 | A1 | 6/2000 |
| WO | 2008044943 | A1 | 4/2008 |
| WO | 2010034044 | A2 | 4/2010 |

OTHER PUBLICATIONS

European Extended Search Report dated Mar. 15, 2016 in Application No. 15003012.0, 9 pages.
European Extended Search Report dated Mar. 14, 2016 in Application No. 15002942.9, 8 pages.
International Preliminary Report on Patentability dated Jun. 2, 2016 for PCT Application No. PCT/US2014/059929, 8 pages.
Notice of Allowance dated May 24, 2016 in U.S. Appl. No. 13/299,856, 15 pages.
European Office Action dated Oct. 24, 2016 in European Patent Application No. 12850527.8, 5 pages.
Non-Final Office Action dated Dec. 30, 2016 in U.S. Appl. No. 14/084,365, 12 pages.
Non-Final Office Action dated Jan. 3, 2017 in U.S. Appl. No. 14/586,575, 8 pages.
Zhongxu Hu et al, Computer vision for shoe upper profile measurement via upper and sole conformal matching, Optics and Lasers in Engineering 45 (2007) 183-190.
European Extended Search Report dated Oct. 13, 2015 in Application No. 12849307.9, 9 pages.
European Extended Search Report dated Oct. 27, 2015 in Application No. 12849978.7, 6 pages.
Final Office Action dated Dec. 17, 2015 in U.S. Appl. No. 13/299,856, 12 pages.
European Extended Search Report dated Nov. 13, 2015 in Application No. 12850527.8, 11 pages.
European Office Action dated Feb. 24, 2017 in European Patent Application No. 12847978.7, 5 pages.
International Search Report with Written Opinion dated Jan. 29, 2013 in Application No. PCT/US12/65516, 8 pages.
International Search Report with Written Opinion dated Feb. 5, 2013 n Application No. PCT/US12/65572, 10 pages.
International Search Report with Written Opinion dated Feb. 8, 2013 n Application No. PCT/US12/65542, 10 pages.
Notice of Allowance dated Feb. 3, 2014 in U.S. Appl. No. 13/299,872, 10 pages.
Non-Final Office Action dated Jan. 13, 2014 in U.S. Appl. No. 13/299,827, 21 pages.
Jin et al., Detection of 3D Curve for Shoe Sole Spraying Based on Laser Triangulation Measurement, Proc. IEEE Int. Conf. on Auto. and Log., Shenyang, China, Aug. 2009, 4 pages.
Non-Final Office Action dated Jun. 3, 2014 in U.S. Appl. No. 13/299,819, 21 pages.
Notice of Allowance dated Jun. 19, 2014 in U.S. Appl. No. 13/299,827, 7 pages.
Non-Final Office Action dated Jul. 7, 2014 in U.S. Appl. No. 13/299,856, 17 pages.
International Search Report with Written Opinion dated Feb. 5, 2013 in Application No. PCT/US2012/065537, 10 pages.
Notice of Allowance dated Oct. 2, 2014 in U.S. Appl. No. 13/299,819, 9 pages.
Final Office Action dated Dec. 4, 2014 in U.S. Appl. No. 13/299,856, 23 pages.
Non-Final Office Action dated Feb. 6, 2015 in U.S. Appl. No. 14/267,503, 10 pages.
Notice of Allowance dated Mar. 16, 2015 in U.S. Appl. No. 14/267,503, 6 pages.
Non-Final Office Action dated Jun. 17, 2015 in U.S. Appl. No. 13/299,856, 13 pages.
Partial European Search Report dated Jul. 24, 2015 in Application No. 12850527.8, 7 pages.
European Extended Search Report dated Sep. 18, 2015 in Application No. 12850224.2, 9 pages.
Final Office Action dated Jul. 11, 2017 in U.S. Appl. No. 14/586,575, 6 pages.
Non-Final Office Action dated Sep. 28, 2017 in U.S. Appl. No. 14/084,365, 18 pages.
Non-Final Office Action dated Oct. 4, 2017 in U.S. Appl. No. 14/468,521, 32 pages.
Non-Final Office Action dated Apr. 11, 2017 in U.S. Appl. No. 14/468,521, 32 pages.
Final Office Action dated Apr. 21, 2017 in U.S. Appl. No. 14/084,365, 15 pages.
Mon-Final Office Action dated Jun. 5, 2017 in U.S. Appl. No. 14/803,347, 10 pages.
European Office Action dated Jul. 12, 2017 in European Patent Application No. 15002942.9, 5 pages.
Notice of Allowance dated Dec. 7 , 2017 in U.S. Appl. No. 14/586,575, 7 pages.
Final Office Action dated Jun. 8, 2018 in U.S. Appl. No. 14/468,521, 15 pages.
Extended Search Report dated Mar. 13, 2018 in European Patent Application No. 18000089.5, 12 pages.
Anonymoous: DAVID—User Manual pp. 1-15, Dec. 15, 2009 (Dec. 15, 2009), XP055455777, Retrieved from the Internet: URL:https://web.archive.org/web/20111026052618/http://david-laserscanner.com:80/wiki/user_manual/frequently_asked_questions [retrieved on Mar. 1, 2018].
Anonymous: "David—User Manual Pages—3D Laser Scanning", Feb. 20, 2009 (Feb. 20, 2009), XP055455780, Retrieved from the Internet: URL:https://web.archive.org/web/20111108145812/http://david-laserscanner.com:80/wiki/user_manual/3d_laser_scanning [retrieved on Mar. 1, 2018].
Final Office Action dated Jun. 13, 2018 in U.S. Appl. No. 14/084,365, 23 pages.
International Search Report and Written Opinion dated Apr. 3, 2018 in International Patent Application No. PCT/US2018/013198, 15 pages.
Non-Final Office Action dated Jul. 5, 2018 in U.S. Appl. No. 15/209,323, 38 pages.
Office Action dated May 7, 2018 in European Patent Application No. 14786585.1, 4 pages.
European Extended Search Report dated Jun. 25, 2018 in U.S. Appl. No. 13/299,872; 9 pages.

(56) References Cited

OTHER PUBLICATIONS

Non-Final Office Action dated Nov. 16, 2018 in U.S. Appl. No. 15/940,162, 12 pages.

AUTOMATED IDENTIFICATION AND ASSEMBLY OF SHOE PARTS

CROSS-REFERENCE TO RELATED APPLICATIONS

This application is a continuation application of U.S. application Ser. No. 14/267,503, filed May 1, 2014, entitled "AUTOMATED IDENTIFICATION AND ASSEMBLY OF SHOE PARTS," which is a continuation application of U.S. application Ser. No. 13/299,872, filed Nov. 18, 2011, entitled "AUTOMATED IDENTIFICATION AND ASSEMBLY OF SHOE PARTS," granted Jun. 17, 2014 as U.S. Pat. No. 8,755,925. The entirety of the aforementioned applications is incorporated by reference herein.

BACKGROUND

Manufacturing a shoe typically requires various assembly steps, such as forming, placing, and assembling several parts. Some methods of completing these steps, such as those that rely heavily on manual execution, can be resource intensive and can have a high rate of variability.

SUMMARY

This summary provides a high-level overview of the disclosure and of various aspects of the invention and introduces a selection of concepts that are further described in the detailed-description section below. This summary is not intended to identify key features or essential features of the claimed subject matter, nor is it intended to be used as an aid in isolation to determine the scope of the claimed subject matter.

In brief and at a high level, this disclosure describes, among other things, the manufacturing and assembly of a shoe, such as an automated placement and attachment of shoe parts. For example, a part-recognition system analyzes an image of a shoe part to identify the part and determine a location of the part. Once the part is identified and located, the part may be manipulated in an automated manner. For example, a first identified part may be placed at a desired location on second identified part using a manufacturing tool. Further, the first identified part may be attached to the second identified part using the manufacturing tool.

An exemplary system that positions and attaches a shoe part in an automated manner may have various components, such as an image recorder that records an image depicting a representation of an attachment shoe part. The system may also comprise a computing device that: (1) identifies a plurality of reference features of the two-dimensional representation of the attachment shoe part; (2) determines pixel coordinates of the image that correspond to the plurality of reference features; (3) converts the pixel coordinates of the image to a geometric coordinate in a geometric coordinate system, which maps a three-dimensional space within which the attachment shoe part is positioned and a manufacturing tool operates; and (4) determines another geometric coordinate in the geometric coordinate system by analyzing a different image of the base shoe part.

The system may further comprise the manufacturing tool which may have a vacuum-powered part holder having a bottom surface adapted for contacting the attachment shoe part and an ultrasonic-welding horn comprised of a distal end adapted for contacting the attachment shoe part such that the distal end extends at least to a plane defined by the vacuum-powered part holder bottom surface. The manufacturing tool may be notified of the other geometric coordinate and transfer the attachment shoe part to the other geometric coordinate, thereby moving the attachment shoe part to a location in the three-dimensional space at which the attachment shoe part is to be temporarily attached to the base shoe part.

An exemplary method for positioning and assembling a shoe part in an automated manner during a shoe-manufacturing process may have various steps. For example, an image may be received that depicts a two-dimensional representation of an attachment shoe part, which is to be attached to a base shoe part. The two-dimensional representation of the attachment shoe part may be associated with at least one reference feature that is identified. An identity of the image may be determined by substantially matching the image to a reference image; the reference image has at least one pre-determined reference feature. In addition, pixel coordinates of the image may be determined that correspond to the at least one pre-determined reference feature and that may be converted to a geometric coordinate of a geometric coordinate system.

Further, another geometric coordinate may also be determined by analyzing a different image of the base shoe part to which the attachment shoe part will be attached. A multi-functional manufacturing tool may be utilized to transfer the attachment shoe part to the other geometric coordinate. The multi-functional manufacturing tool may also be utilized to attach the attachment shoe part to the base shoe part Another exemplary method of positioning and joining a plurality of manufacturing part utilizing automated identification of manufacturing parts and a manufacturing tool comprises of a vacuum-powered part holder and an ultrasonic-welding horn may also have various steps. For instance, a three-dimensional space within which a first manufacturing part is positioned and the manufacturing tool operates may be automatically identified. Further, a position of a second manufacturing part may also be automatically identified. Based on the identification of the first manufacturing part, the manufacturing tool may be positioned such that the vacuum-powered part holder is proximate to the first manufacturing part. A vacuum force may then be generated and transferred through a bottom surface of the vacuum-powered part holder sufficient to temporarily maintain the first manufacturing part in contact with at least a portion of the vacuum-powered part holder.

Continuing, based on the position of the second manufacturing part, the first manufacturing part may be transferred to the second manufacturing part. The first manufacturing part may be subsequently released from the vacuum-powered part holder so that it is in contact with the second manufacturing part. The manufacturing tool may be positioned such that the ultrasonic-welding horn is proximate the first manufacturing part, and ultrasonic energy may be applied through the ultrasonic-welding horn, where the ultrasonic energy may be effective for joining the first manufacturing part with the second manufacturing part.

BRIEF DESCRIPTION OF THE DRAWINGS

Illustrative examples of the present invention are described in detail below with reference to the attached drawing figures, wherein.

DETAILED DESCRIPTION

The subject matter of certain aspects of the present invention is described with specificity herein to meet statutory requirements. But the description itself is not intended to define what is regarded as an invention, which is what the claims do. The claimed subject matter may comprise different elements or combinations of elements similar to the ones described in this document, in conjunction with other present or future technologies. Terms should not be interpreted as implying any particular order among or between various elements herein disclosed unless explicitly stated.

In brief and at a high level, this disclosure describes, among other things, the manufacturing and assembly of a shoe, such as an automated placement and attachment of shoe parts. For example, a part-recognition system analyzes an image of a shoe part to identify the part and determine a location of the part. Once the part is identified and located, the part may be manipulated in an automated manner. For example, a first identified part may be placed at a desired location on second identified part using a manufacturing tool. Further, the first identified part may be attached to the second identified part using the manufacturing tool.

A. Automated Identification of Shoe Parts

Figure 1A:
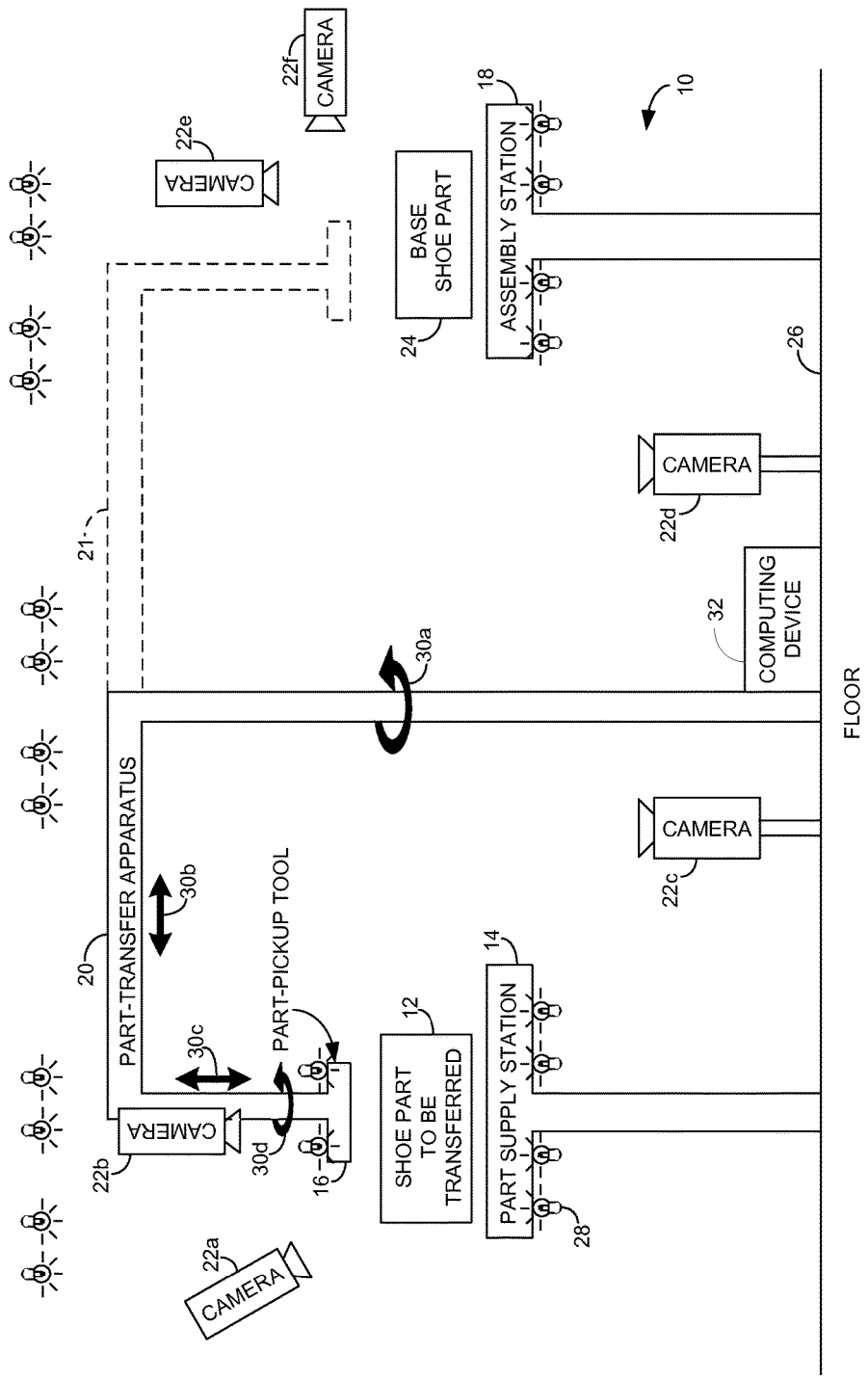
FIG. 1A depicts a schematic diagram of an exemplary system for shoe part identification in accordance with the present invention.

Subject matter described herein relates to an automated placement of a shoe part, and FIG. 1A depicts an exemplary system 10 that may perform various actions in a shoe-manufacturing process. For example, a shoe part 12 may be provided at a supply station 14 together with several other shoe parts. Supply station 14 may provide only a single type of part or multiple types of parts that are identified individually by system 10. Supply station 14 may comprise a conveyor belt, a table, a robotic arm, or any other device that can make shoe part 12 available for identification and/or manipulation in accordance with the present invention. An automated tool 16 may pick up the shoe part 12 from the supply station 14, and the shoe part 12 may be transferred to an assembly station 18 by a multi-functional manufacturing tool 20. The multi-functional manufacturing tool 20 may comprise a part-pickup portion, a part-transfer portion, and/or a part-attachment portion. As used throughout this application, the terms part-pickup tool/apparatus, part-transfer tool/apparatus, part-attachment or attachment tool/apparatus may comprise different names for the portions of the multi-functional manufacturing tool 20 and may be used interchangeably with the term multi-functional manufacturing tool 20. The multi-functional manufacturing tool 20 will be discussed in greater depth below.

A ghost depiction 21 of part-transfer apparatus is depicted to illustrate that the part-transfer apparatus may move to various positions. Moreover, various arrows 30a-d are depicted that show possible movement directions or rotations of respective components of part-transfer apparatus 20. Part-transfer apparatus 20 and the movement directions and rotations depicted by FIG. 1A are exemplary only. For example, arrows 30a and 30d indicate that respective arms of part-transfer apparatus 20 may rotate, whereas arrows 30b and 30c indicate that respective arms may move vertically or horizontally (e.g., in a telescoping manner). Although not depicted, arms of part-transfer apparatus may also be comprised of articulating joints that enable additional ranges of motion of part-transfer apparatus 20. The shoe part 12 that is transferred may function as a base shoe part 24 at the assembly station 18. Alternatively, the shoe part 12 that is transferred may be attached to a base shoe part 24 that is already positioned at the assembly station 18.

When identifying and/or placing shoe part 12 by part-transfer apparatus 20, one or more cameras 22a-f may record images of the shoe part 12 that may be used to recognize the shoe part 12. The cameras 22a-f may be arranged at various positions in system 10, such as above a part supply station (e.g., 22a), on part-transfer apparatus 20 (e.g., 22b), along a floor 26 (e.g., 22c and 22d), and/or above assembly station 18 (e.g., 22e and 22f). In addition, the cameras 22a-f may be arranged at various perspectives, such as vertical (e.g., 22b, 22c, 22d, and 22e), horizontal (e.g., 22f), and angled (e.g., 22a). The number, location, and/or orientation of cameras 22a-f may vary beyond the example illustrated in FIG. 1A.

The images may be used to determine a position and/or orientation of the shoe part 12 relative to part-transfer apparatus 20 and a position to which shoe part 12 is to be transferred. Once the shoe part 12 has been recognized, other shoe-manufacturing processes may be carried out in a manual and/or an automated fashion, such as transferring the shoe part, attaching the shoe part via any attachment method, cutting the shoe part, molding the shoe part, etc.

In a further aspect, information (e.g., shoe-part identity and orientation) obtained by analyzing images of the shoe part 12 may be combined with information derived from other shoe-part analysis systems in order to carry out shoe-manufacturing processes. For example, a three-dimensional (3-D) scanning system may derive information (e.g., shoe-part surface-topography information, shoe-part-size information, etc.) from scans of the shoe part (or from scans of another shoe part that is assembled with the shoe part), and the 3-D-system-derived information may be combined with the shoe-part-identity and/or shoe-part orientation information. That is, the 3-D-system-derived information may be determined upstream and communicated downstream to system 10 (or vice versa).

Information that is combined from different systems may be used in various manners. In an exemplary aspect, if system 10 is used to attach shoe part 12 onto shoe part 24, information obtained from another system may be used to instruct and carry out an attachment method. For example, an amount of pressure may be calculated (based on information provided by another system) that is recommended to be exerted against the shoe part 12 in order to sufficiently attach the shoe part to one or more other shoe parts 24. Such pressure measurements may be dependent on various factors determined and/or communicated from another system, such as a size (e.g., thickness) of the shoe part and/or a number of shoe parts (e.g., layers) that are being attached.

Computing device 32 may help execute various operations, such as by analyzing images and providing instructions to shoe-manufacturing equipment. Computing device 32 may be a single device or multiple devices, and may be physically integrated with the rest of system 10 or may be physically distinct from other components of system 10. Computing device 32 may interact with one or more components of system 10 using any media and/or protocol. Computing device 32 may be located proximate or distant from other components of system 10.

Light-emitting devices 28 may be positioned throughout system 10 and may be used to enhance a contrast of shoe part 12 that may be useful when an image of shoe part 12 is used to recognize shoe part 12. Light-emitting devices may be incandescent bulbs, fluorescent devices, LEDs, or any other device capable or emitting light. A light-emitting device may be positioned in various locations, such as near and/or integrated into supply station 14 or part-pickup tool 16. Additionally, a light-emitting device may be positioned near or integrated into assembly station 18. Moreover, light-emitting devices may be positioned throughout the space that surrounds part-transfer apparatus 20, part-pickup tool 16, part supply station 14, assembly station 18, and cameras 22a-f. Varying numbers, types, and positions of light emitting devices may be used in accordance with the present invention. Light emitting devices may be selected based upon the spectrum of light emitted and how that spectrum interacts with spectrums reflected by shoe part 12, supply station 14, assembly station 18, part-pickup tool 16, etc. For example, light-emitting devices may provide full-spectrum light and/or partial-spectrum light (e.g., colored light).

Various aspects of FIG. 1A have been described that may also be applicable to other systems described in this disclosure, such as systems depicted in FIGS. 2, 4, 5, and 6. Accordingly, when describing these other systems, reference may also be made to FIG. 1A and aspects described in FIG. 1A may also apply in these other systems.

As indicated with respect to FIG. 1A, some aspects of the invention are directed to using an image of a shoe part to identify certain shoe-part information, such as an identity of the shoe part and an orientation of the shoe part (e.g., position and rotation). The shoe-part identity and shoe-part orientation may then be used to carry out various shoe-manufacturing steps (e.g., placement, attachment, molding, quality control, etc.). Accordingly, certain processes may be executed before the image is recorded in order to facilitate shoe-part-image analysis, and reference is made to FIG. 1B to describe such aspects.

Figure 1B:
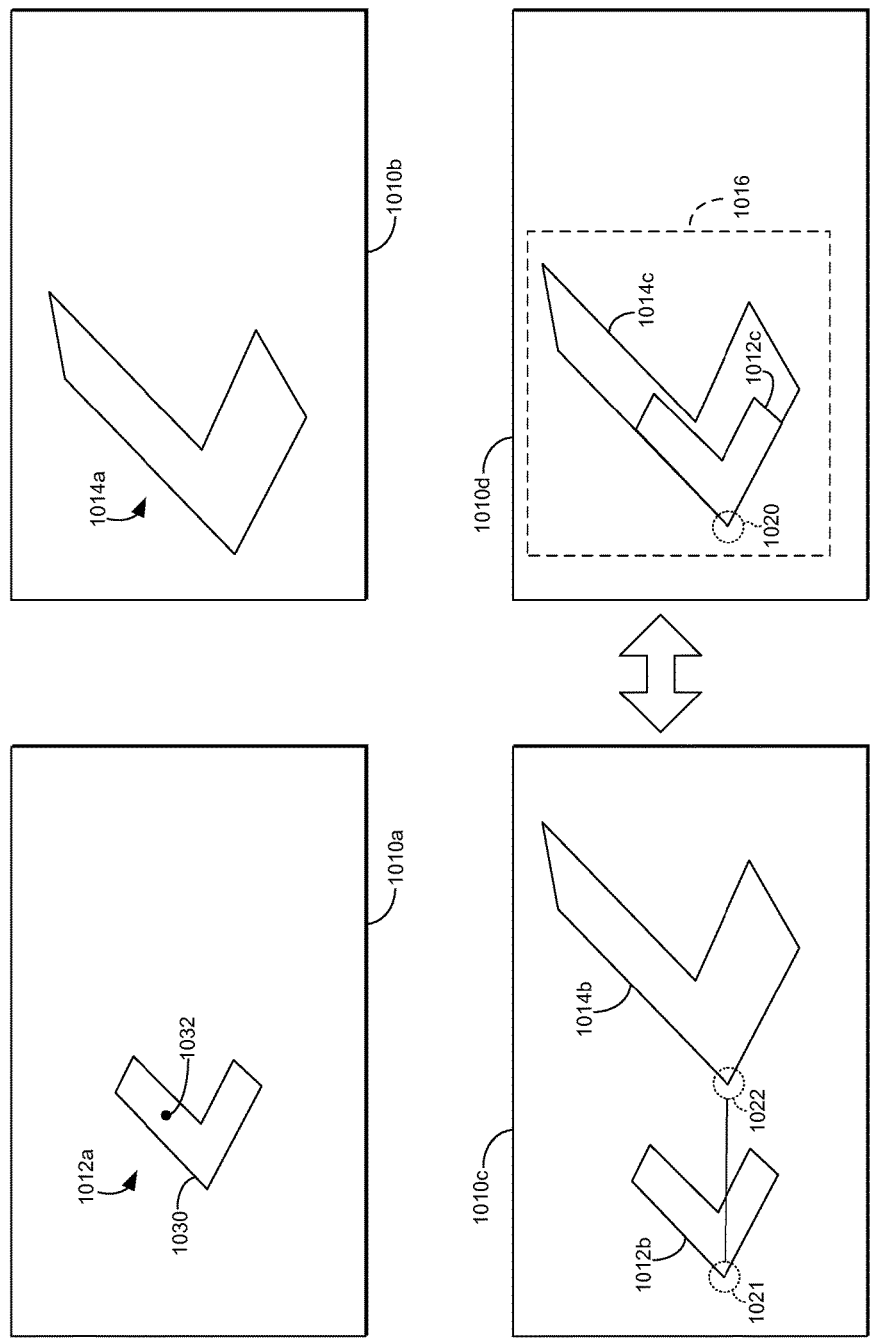
FIG. 1B illustrates exemplary shoe-part references that may be generated and analyzed in accordance with the present invention.

FIG. 1B illustrates various depictions 1010a-d, each of which provides one or more exemplary shoe-part reference patterns or models (hereinafter known as shoe-part references). For example, depiction 1010a provides an exemplary shoe-part reference 1012a, and depiction 1010b provides a different shoe-part reference 1014a. Depictions 1010a-d may represent data that is maintained in a computer-storage medium and is retrievable to execute computing functions. For example, depictions 1010a-d may be stored in a computer-storage media as reference models or patterns and retrieved in order to be viewed on a computing output device (e.g., computer display monitor).

Shoe-part references 1012a and 1014a may be determined and/or created using various techniques, such as by using a computer-assisted drawing program, an automatic shape-outlining computer program, or other boundary-determination computer program. For example, an electronic image of a shoe part may be recorded and analyzed by the automatic shape-outlining computer program, which automatically traces boundaries or perimeters of shapes that comprise the shoe part. In another aspect, shapes depicted in an electronic image of a shoe part may be manually traced using a computer-drawing application. In another example, a shoe part and/or a boundary associated therewith may be manually drawn using a computer-drawing application. FIG. 1B depicts that shoe-part references may be comprised of a shoe-part perimeter or boundary (e.g., 1030), as well as an interior portion (e.g., 1032) bound by the perimeter 1030. As previously indicated, once created, a shoe-part reference may be electronically stored (e.g., item 234 in FIG. 2) and used in various manners, such as to analyze shoe-part images.

In one aspect, a shoe-part reference (e.g., shoe-part reference 1012a) is created such that it may be scaled to correspond to a multiple of different shoe sizes. For example, a shoe-part reference corresponding to a model size (i.e., a model size for females and a model size for males) is created and all other matching shoe-part references are scaled off of the shoe-part reference corresponding to the model size. A shoe-part reference may be scaled up to, for example, five times to account for the different sizes. Further, the shoe-part reference can be scaled to allow for expansion and/or shrinkage for any particular size.

Continuing, references 1012a and 1014a may be used to determine reference information, which may be subsequently used to assemble shoe parts. For example, an attachment shoe part (e.g., 224 in FIG. 2) may be positioned relative to a base shoe part (e.g., 226 in FIG. 2); however, before the attachment shoe part is positioned, it may be helpful to determine a placement location at which the attachment shoe part should be positioned.

As such, in an illustrative aspect, depiction 1010c comprises a reference 1014b, which represents a physical boundary of a base shoe part, and a reference 1012b, which represents a physical boundary of an attachment shoe part. In an exemplary aspect, reference 1012b may be positioned to overlay reference 1014b and may be aligned with at least a portion of the reference 1014b. For example, boundary 1012b may be manually and/or automatically positioned (e.g., drag via input device) in a manner that is consistent with how an attachment shoe part would be arranged onto a base shoe part when the attachment shoe part will be attached to the shoe part. As such, depiction 1010d illustrates a digitally rendered assembly of references 1016, which is comprised of reference 1012c aligned with reference 1014c in a position consistent with an attachment position.

In a further aspect of the invention, a reference feature 1020 may be identified that aligns a portion of reference 1012c with a portion of reference 1014c. As such, each of references 1012c and 1014c comprises respective reference features that are generally aligned with one another. These respective reference features are shown in depiction 1010c and are identified by reference numerals 1021 and 1022. For example, a respective reference feature may be used to determine an orientation (e.g., position and rotation) of a shoe part, as well as a portion of the shoe part that aligns with another shoe part.

Figure 2:
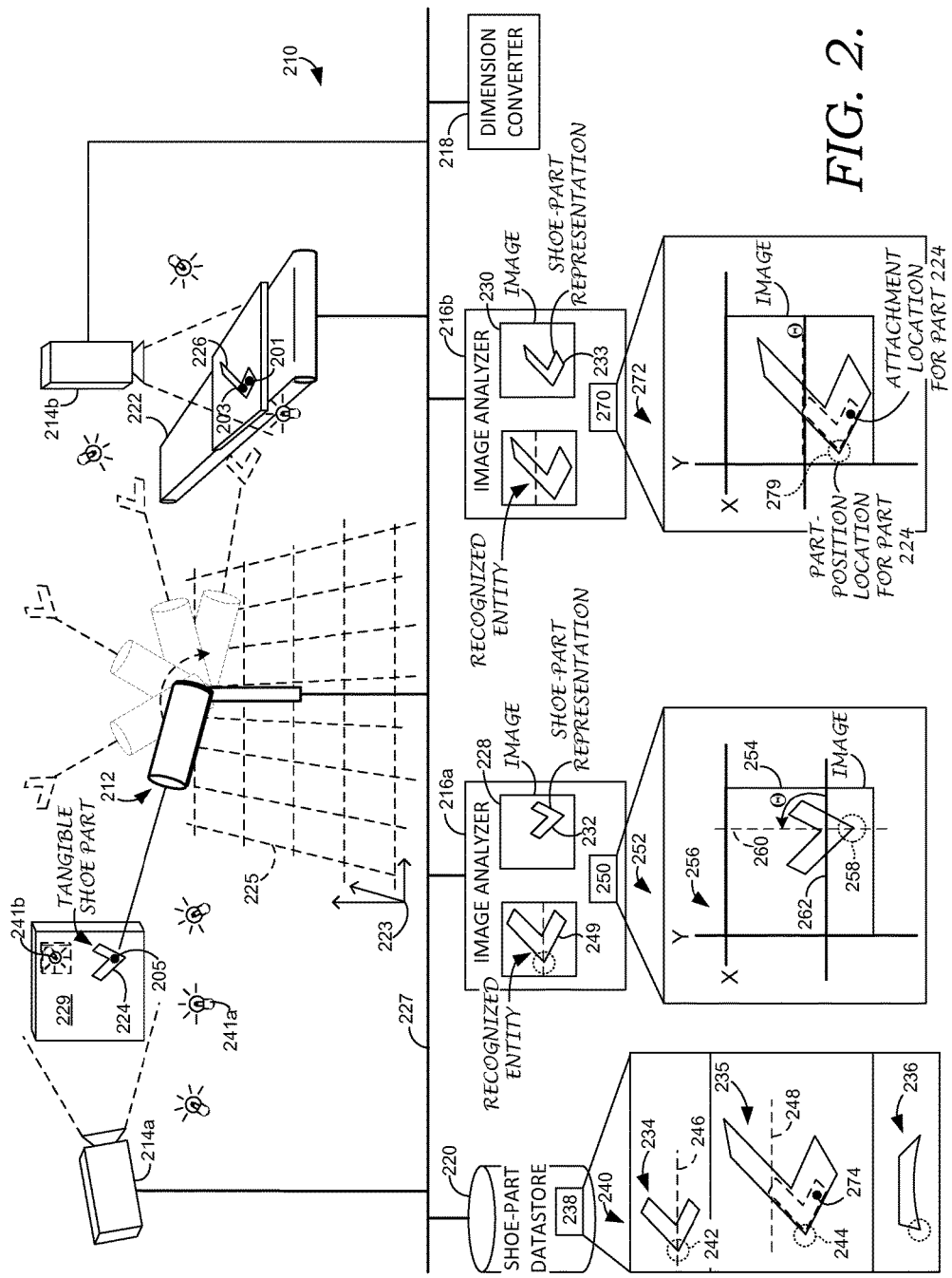
FIG. 2 depicts a schematic diagram of an exemplary system for shoe-part identification in accordance with the present invention.

Now described is FIG. 2, in which an exemplary shoe-manufacturing system 210 is depicted. System 210 may have a combination of shoe-manufacturing equipment and computing devices, which may assist in determining automated operations of the equipment. Operations carried out in system 210 may facilitate manipulation of shoe part 224 and shoe part 226, such as by transferring shoe part 224 and attaching shoe part 224 onto shoe part 226. For example, shoe parts 224 and 226 may comprise two different pieces of flexible material, which are attached to one another to form part of a shoe upper. Shoe parts 224 and 226 may comprise the same or different types of flexible material, such as textiles, leathers, TPU materials, etc. Shoe parts 224 and 226 may be physical structures of the completed shoe and/or a component, such as an adhesive film, that may be used to join shoe components during the shoe manufacturing process.

A part-transfer apparatus 212, cameras 214a and 214b, and conveyor 222 are examples of shoe-manufacturing equipment. A grid 225 is depicted in FIG. 2 (in broken lines) to convey that one or more items of the shoe-manufacturing equipment have a known position within a coordinate system (e.g., geometric coordinate system mapping a 3-D space within which the equipment is positioned). Other items, such as shoe parts, may be moved to known distances within the coordinate system. Although for illustrative purposes grid 225 only depicts two coordinates, axis arrows 223 depict three axes.

Image analyzers 216a and 216b and dimension converter 218 represent operations and/or modules that may be carried out by a computing device. Moreover, FIG. 2 depicts that the shoe-manufacturing equipment may communicate with (i.e., be networked with) computing devices that execute the depicted operations by way of a network connection 227. For example, as will be described in more detail below, image analyzers 216a and 216b may evaluate images recorded by cameras 214a and 214b to recognize shoe parts being utilized in the shoe manufacturing process. In addition, image analyzers 216a-b and dimension converter 218 communicate instructions to part-transfers apparatus 212. One example of this type of vision recognition system includes Cognex® machine vision systems.

Components depicted in system 210 cooperate in different ways to assist in carrying out various steps of a shoe-manufacturing method. For example, some components of system 210 may operate collectively as part of a two-dimensional ("2-D") part-recognition system, which is used to determine various shoe-part characteristics, such as shoe-part identity and shoe-part orientation (e.g., placement and rotation) relative to part-transfer apparatus 212. For example, a part-recognition system may comprise cameras 214a-b, image analyzers 216a-b, shoe-part datastore 220, dimension converter 218, and some or all of part-transfer apparatus 212.

Figure 3:
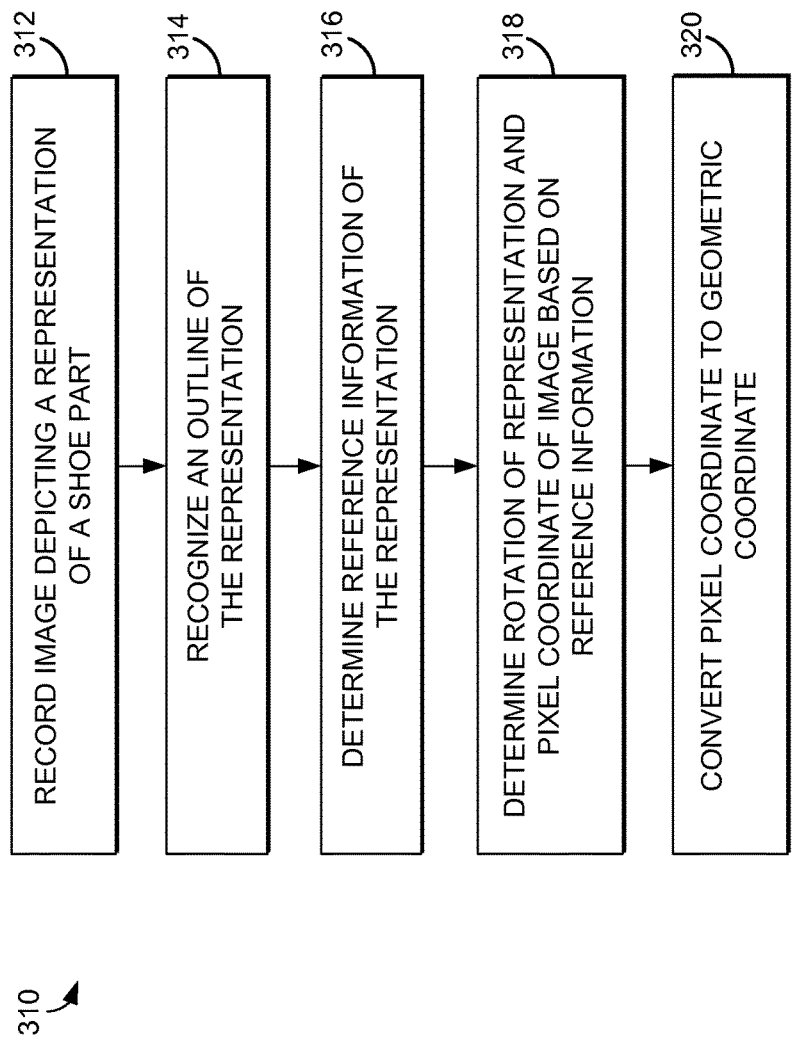
FIG. 3 depicts a flow diagram of a method for analyzing an image of a shoe part.

A part-recognition system may be used in various manners within a shoe manufacturing process. For example, a part-recognition system may be used to execute a method 310 that is outlined in FIG. 3. Method 310 relates to identifying a shoe part and determining an orientation (e.g., geometric position and degree of rotation) of the shoe part. When an identity and orientation of a shoe part is known or determined, the shoe part can be manipulated (e.g., transferred, attached, cut, molded, etc.) in an automated manner. In describing FIG. 3, reference will also be made to FIG. 2 and FIG. 4.

At step 312, an image is recorded that depicts a representation of a shoe part. For example, an image may be recorded by camera 214a or 214b and communicated to an image analyzer 216a or 216b. Exemplary images 228 and 230 are illustrated in image analyzers 216a and 216b (respectively), and each image depicts a two-dimensional ("2-D") representation 232 and 233 of a respective shoe part.

In step 314, an outline or perimeter of the representation as depicted in the image is recognized. For example, once image analyzer 216a acquires image 228, image analyzer 216a recognizes a perimeter or outline of the 2-D representation 232 depicted in image 228. Perimeter or outline recognition may be enhanced using various techniques, such as by providing a background surface that highly contrasts a part depicted in the image, as well as by positioning various environment lighting elements (e.g., full-spectrum light-emitting devices). For example, if a surface of the shoe part that will be captured in the image is grey, a background surface (e.g., surface of a supply station, a part-pickup tool, or an assembly station) may be colored yellow in order to create a contrast in the image between the outline of the part and the background. In one aspect, shoe-part inward-facing surfaces (i.e., a side of the shoe part that may face inward and towards a wearer's foot when assembled into a shoe) and background surface may be manufactured (i.e., intentionally made) to comprise known contrasting colors.

Additional tools may be used to assist with recognizing a perimeter or outline of a representation. For example, system 210 may comprise light-emitting devices 241a and 241b that illuminate the shoe part from various sources. As described with respect to FIG. 1A, light-emitting devices may be arranged in various positions throughout system 210. For example, surface 229 may be illuminated with device 241a or backlit with light 241b, thereby enhancing a contrast between surface 229 and part 224 to render part 224 more recognizable to the 2-D recognition system. That is, if part 224 is illuminated or backlit when image 228 is captured, a better contrast may appear in image 228 between representation 232 and other portions of the image. A full-spectrum light may be used for enhancing part recognition of parts having various colors. Alternatively, a color of the light may be customized based on a color of part 224 and/or the color of supply station and/or assembly station. For example, a red light may be used to enhance a contrast between parts and a supply assembly station that are black or white.

Next, at step 316, image analyzer 216a may determine a plurality of reference features associated with the 2-D representation 232 depicted in image 228. For instance, the reference features may comprise a number of spaced lines and/or points that define the outline or perimeter of the 2-D representation. The spacing between adjacent reference features may be variable. For instance, the spacing between reference features for smaller-sized shoe parts may be less than the spacing between reference features for larger-sized shoe parts to allow for more precision. Each reference feature may be comprised of a variable number of pixels.

An identity of a boundary of the 2-D representation 232 may be recognized using various techniques. For example, shoe-part representation 232 may be compared to various known or model shoe-part references 234-236, which are stored in shoe-part datastore 220 in order to determine the identity of the shoe-part representation 232.

Shoe-part datastore 220 stores information 238, which is shown in an exploded view 240 for illustrative purposes. As an example, exploded view 240 depicts a plurality of known shoe-part references 234-236 that may be used to recognize the identity of the 2-D representation 232. Shoe-part references 234-236 may be associated with pre-determined reference features (e.g., 242 and 244) as outlined above with respect to FIG. 1B, which may be used when assembling a respective shoe part into a shoe. Such reference features may be pre-determined based on various factors, such as a known position of a shoe part among an assembly of shoe parts. For example, when incorporated into a shoe, shoe part 224 is assembled at a position with respect to shoe part 226. As such, this position may be measured and used to instruct shoe-manufacturing equipment on positioning and attachment of shoe part 224.

As depicted in FIG. 2, shoe-part references 234-236 form various 2-D shapes. In an aspect of the invention, the pre-determined reference features may comprise any number of features associated with the perimeter or outline of the shoe-part references 234-236. For example, a reference feature may comprise a specified proportion between different sides of the 2-D shape. As well, a reference feature may comprise a junction point between two adjacent sides of the 2-D shape. Creating pre-determined reference features along a perimeter of the shape can reduce variability that may be created when shoe parts are aligned and connected.

The image analyzer 216a may recognize an identity of the 2-D representation 232 by identifying at least one shoe-part reference of the plurality of shoe-part references 234-236 that substantially matches the 2-D shoe-part representation 232. For example, the image analyzer 216a may recognize the identity of the 2-D shoe-part representation 232 by identifying at least one pre-determined reference feature of a shoe-part reference that substantially matches the at least one reference feature of the 2-D representation 232.

Once a shoe-part representation (e.g., 232) is substantially matched to a known shoe-part reference (e.g., 234), the pre-determined reference feature(s) may be used to analyze an image that depicts the representation. For example, image analyzer 216a has retrieved a recognized entity 249 based on shoe-part reference 234, which was substantially matched to 2-D representation 232. As depicted, recognized entity 249 has a boundary and pre-determined reference feature(s). Accordingly, when the descriptions of FIGS. 1B and 2 are collectively considered, an exemplary method may comprise various steps. For example, model references (e.g., 1012a and 1014a) and their corresponding pre-determined reference features (e.g., 1021 and 1022) are determined and electronically maintained, such as in datastore 220. A recorded image (e.g., 228 and 230) may then be substantially matched to a model reference by substantially matching reference features of the recorded image with pre-determined reference features of the model. This reference information may be mathematically depicted with respect to a known reference system.

At step 318, a rotation of the representation (as depicted in the image) and pixel coordinates of the image are identified. To illustrate one manner in which image analyzer 216a utilizes recognized entity 249 to execute step 318, information 250 is depicted in an exploded view 252. Exploded view 252 depicts image 254 that is identical to image 228. For example, image 254 and image 228 may be the same data, or image 254 may be a copy of image 228. Image 254 is depicted respective to a coordinate system 256, which maps pixels of image 254. Recognized entity 249 is applied to image 254, such as by substantially centering image 254 within the boundaries of recognized entity 249 and aligning by reference feature(s) 258. As such, pixel coordinates of image 254 can be determined that belong to coordinate system 252. In addition, a degree of rotation (i.e., 0) of the shoe-part representation (as depicted in image 254) is determined by measuring an angle between reference lines 260 and 262.

The pixel coordinates and degree of rotation that are extracted from the image may be used to instruct part-transfer apparatus 212. That is, image 228 may be recorded by camera 214a when shoe part 224 is oriented (i.e., positioned and rotated) somewhere in the 3-D space in which part-transfer apparatus 212 operates. Examples of positions at which shoe part 224 may be located include a part supply station, an assembly station, and/or held by part-transfer apparatus 212. Accordingly, when certain inputs are provided, pixel coordinates of image 228 may be converted by dimension converter 218 to a geometric coordinate 205 of the system represented by grid 225. Accordingly, in step 320 of method 310 the pixel coordinates may be converted to a geometric coordinate.

Figure 4:
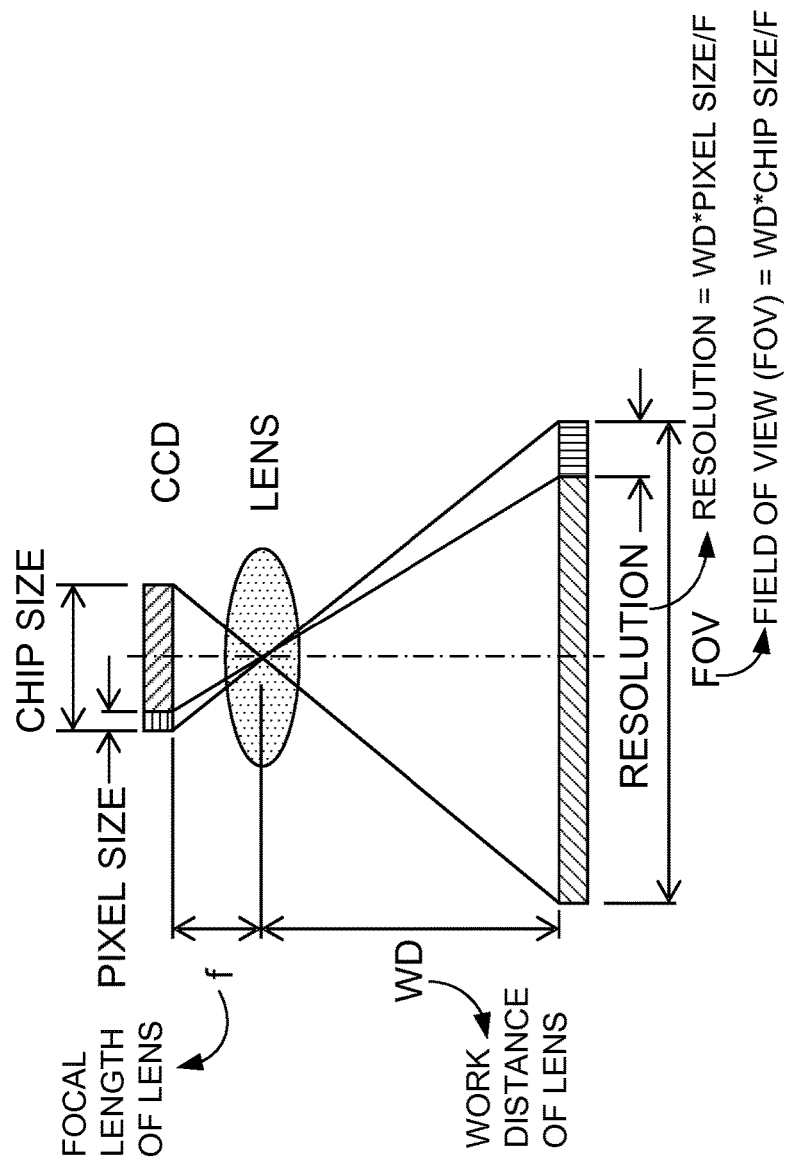
FIG. 4 depicts a schematic diagram of an exemplary image-recording system.

Inputs utilized by dimension converter 218 may comprise measurement values describing system 210, camera 214a, and part-transfer apparatus 212. Examples of such measurement values are relative positions (i.e., zero positions) of camera 214a and of part-transfer apparatus 212; a number of pixels of the X and Y coordinates of system 256; a distance between camera 214a and part 224; a chip size of the CCD in camera 214a; a lens focal length; a field of view; a pixel size; and a resolution per pixel. These inputs may vary depending on the capabilities of the equipment used in system 210 and some inputs may have a direct bearing on where equipment may be positioned within system 210. For example, the strength of camera 214a may have a bearing on where part 224 should be positioned (relative to camera 214a) when camera 214a will record an image of part 224. To further illustrate a relationship between various inputs used to convert a pixel coordinate to a geometric coordinate, FIG. 4 depicts a schematic diagram of a system with which an image may be recorded and analyzed.

The geometric coordinate generated by dimension converter 218 can be used to report a position of shoe part 224 to part-transfer apparatus 212. Moreover, the degree of rotation can be used to determine to what extent shoe part 224 may need to be rotated by part-transfer apparatus 212 in order to be properly aligned for subsequent manipulation (e.g., attachment to another shoe part, cutting, painting, etc.). Accordingly, part-transfer apparatus 212 may comprise a part-pickup tool that enables part-transfer apparatus 212 to acquire part 224 from a part-supply area and temporarily hold part 224 while transferring part 224 to a new location. For example, part-transfer apparatus 212 may use a gripping structure, suction, electromagnetic forces, surface tack, or any other methodology to temporarily engage and move a shoe part.

Although the above 2-D recognition process is described by referencing shoe part 224 and image 228, a similar analysis may be used to identify shoe part 226 and determine its orientation, thereby enabling part-transfer apparatus 212 to account for part 226 when manipulating part 224. That is, information 270 is depicted in image analyzer 216b and is shown in an exploded view 272 for illustrative purposes. Exploded view 272 conveys that image 230 may be analyzed similar to image 228 to determine an orientation (i.e., geometric coordinate and degree of rotation) of part 226 based on reference feature(s) 279 and theta. Any number of shoe parts may be identified and/or positioned, either simultaneously or sequentially in accordance with the present invention.

Once respective geometric coordinates of part 224 and part 226 are known, part-transfer apparatus 212 can pick up part 224 and move part 224 to a part-position coordinate 203 that is relative to the geometric coordinate of part 226. For example, FIG. 2 depicts multiple broken-line views of part-transfer apparatus 212 to illustrate a movement of part-transfer apparatus and a transfer of part 224. A part-position coordinate 203 refers to a coordinate in the geometric coordinate system (e.g., the system illustrated by grid 225) to which an attachment part (e.g., part 224) is transferred in order to be attached to a base part (e.g., part 226). For example, part-transfer apparatus 212 may transfer part 224 to geometric coordinate 203 to be attached to part 226.

A part-position coordinate 203 may be determined in various ways. For example, part 226 may be a base shoe part onto which part 224 is attached, such that a position of part 224 respective to part 226 (when the parts are assembled) is known. As such, the known position may be determined by retrieving a stored reference feature, which was pre-determined using a method similar to that described with respect to FIG. 1B. However, this position that is known may still be converted to a coordinate that is recognized by part-transfer apparatus 212 when part 226 has been positioned within a coordinate system of part-transfer apparatus 212. That is, outside of coordinate system 225, a position relative to part 226 at which part 224 is arranged is known, and is identified by reference numeral 277 in datastore 220. This position is also identified in exploded view 272 in which the position is identified as "part-position location for part 224." When an orientation of part 226 is determined, such as by executing method 310, the point 277 (also depicted in exploded view 272) that is respective to part 226 at which part 224 is arranged can be converted to a geometric coordinate 203 within system 225, thereby calculating part-position coordinate 203. Accordingly, in an exemplary aspect, part-position 203 is converted to a geometric coordinate based in part on reference feature 1022, which was described with reference to FIG. 1B.

In a further aspect, once part-position point 203 is determined, part 224 can be transferred to the part-position coordinate 203 based on the reference information determined with respect to part 224 (e.g., 1021 in FIG. 1B). For example, pixel coordinates and orientation may be derived from image 228 (as described above) and may be converted to a geometric coordinate (e.g., 205). Calculations may then be made to transfer part 224 to point 203. For example, a virtual robot end effector may be created based on the geometric data (e.g., 203 and 205) and may be moved from point 205 to point 203. While these steps are depicted graphically in FIG. 2 for illustrative purposes, these steps could also be executed mathematically by solving sequential conversion algorithms.

Accordingly, the above-described recognition process (e.g., method 310) may be used in many different scenarios within a shoe-manufacturing process. For example, once shoe part 224 has been positioned respective to shoe part 226, shoe part 224 can be attached to shoe part 226, such as by stitching, adhering, and/or sonic welding. As such, in order to enable automation, a geometric coordinate 201 of the attachment point is also determined. That is, once geometric coordinates of parts 224 and 226 are known within coordinate system 225, geometric coordinates of attachment locations can also be calculated.

An attachment-point coordinate 201 may be determined in various ways. For example, part 226 may be a base shoe part onto part 224 is attached. As such, a point of attachment onto base shoe part is known, but it still may be converted to a coordinate that is recognized by part-transfer apparatus 212. That is, outside of coordinate system 225, a point on part 226 at which part 224 will be attached is known, and is identified by reference numeral 274 in datastore 220. When an orientation of part 226 is determined, such as by executing method 310, the point 274 (also depicted in exploded view 272) on part 226 at which part 224 is attached can be converted to a geometric coordinate 201 within system 225. As such, an attachment process can be executed at the geometric coordinate 201. As indicated above, although these steps are depicted graphically in FIG. 2 for illustrative purposes, these steps could also be executed mathematically by solving sequential conversion algorithms.

In one aspect, part-transfer tool 212 also may have an attachment device, which operates to attach part 224 to part 226. Exemplary attachment devices are an ultrasonic welder, heat press, stitching apparatus, or a device that accomplishes a respective method of attachment. For instance, an ultrasonic welder may apply ultrasonic energy through an ultrasonic-welding horn in order to attach in a temporary or permanent fashion parts 224 and 226.

The components of system 210 may be arranged in various configurations to accomplish a wide range of shoe-manufacturing processes. In addition, there may be additional components arranged into a series of stations. For example, system 210 may be comprised of cameras in addition to cameras 214a-b, as well as additional part-transfer apparatuses. Different types of cameras and/or part transfer apparatuses may be combined in accordance with the present invention. These additional tools may be arranged at different positions along conveyor 222 to allow additional parts to be added (e.g., added to the assembly of parts 224 and 226) and to allow additional shoe-part manipulation.

Moreover, the cameras of system 210 may be arranged at different positions with respect to a shoe part. For example, as depicted in FIG. 1A, cameras may be positioned above a shoe part, below a shoe part, horizontal to a shoe part, or at an angle away from a shoe part, so long as the camera position allows the geometric coordinate of the part to be calculated. One such camera position may be perpendicular to (i.e., normal to) a viewing plane. However, the camera could be positioned at an angle from the viewing plane, so long as the angle is provided as an input to the system when converting the representation orientation to a geometric coordinate. Accordingly, system 210 may be incorporated into larger shoe-manufacturing processes.

A 2-D recognition system may be used at an initial stage to enable part-transfer apparatus 212 to position a base shoe part onto a conveyor or other part-moving apparatus. A base shoe part refers to a shoe part onto which one or more other shoe parts may be attached, and a base shoe part may be constructed of a single part or a plurality of parts that have been assembled. Accordingly, part 226 may be deemed a base shoe part onto which part 224 is attached. Parts transferred may also be foams, mesh, and/or adhesive layers, such as TPU films, ultimately used to join other parts together. Further, component parts previously affixed to one another in accordance with the present invention may be treated as a single part for subsequent identification transfer, etc.

Figure 5:
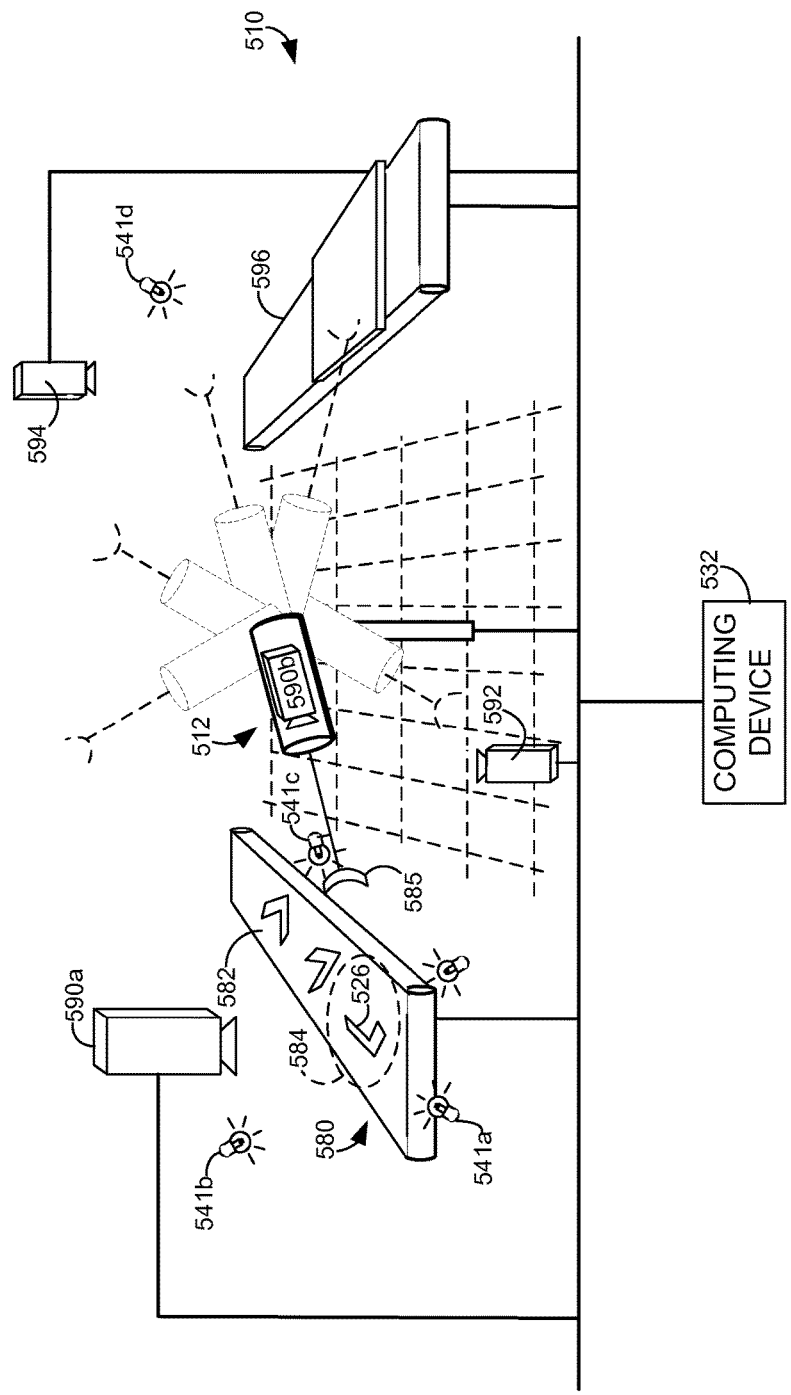
FIGS. 5 and 6 depict a respective schematic diagram of an exemplary system for carrying out shoe-manufacturing methods.

Referring to FIG. 5, a system 510 is depicted in which a 2-D part-recognition system may be used at an initial manufacturing stage, such as when the base shoe part 526 is initially stored at a part-supply station 580, which may be comprised of various configurations. For example, a part-supply station 580 may comprise a set of stacked base shoe parts from which part-transfer apparatus 512 acquires a topmost base shoe part. Alternatively, the part-supply station may have a conveyor 582 that transfers the base shoe part to a pickup location 584 at which part-transfer apparatus 512 acquires the base shoe part. As previously described, part-transfer apparatus 512 may have a part-pickup tool 585.

Prior to transferring base shoe part 526 to conveyor 596, a camera may record an image of the base shoe part 526 to allow part-transfer apparatus 512 to determine a geometric position and rotation of the base shoe part 526. For example, a camera may record an image of the base shoe part 526 when the base shoe part 526 is next-in-line to be acquired by part-transfer apparatus 512—i.e., immediately prior to the base shoe part 526 being acquired by part-transfer apparatus 512 and when the base shoe part 526 is at pickup location 584. The camera may be an above-mounted camera 590*a-b* that is mounted above, and perpendicular to, the base shoe part 526. As depicted in FIG. 5, an above-mounted camera 590*a-b* may be mounted either apart from (e.g., 590*a*) or onto (e.g., 590*b*) part-transfer apparatus 512.

Although part-transfer apparatus 512 is illustrated to have a certain configuration depicted in FIG. 5, part-transfer apparatus may have a different configuration, such as the configuration depicted in FIG. 1A, in which a camera mounted to the part-transfer apparatus may be positionable directly above and perpendicular to base shoe part 526. Part-transfer apparatus 512 may also comprise a plurality of articulating arms that enable movement of a camera (or an acquired shoe part) to a desired angle or position.

Moreover, if the image is recorded while the base shoe part 526 is at a part-supply station (i.e., at location 584), a light-emitting device may be arranged at various positions throughout system 510. For example, a light-emitting device 541*a* may be positioned adjacent to or incorporated into the part-supply station 580 to provide a backlight to the base shoe part 526. Also, a light-emitting device 541*b* may be positioned in a space that surrounds base shoe part, such that the light-emitting device 541*b* illuminates base shoe part 526 from a front side.

Alternatively, part-transfer apparatus 512 may acquire base shoe part 526 before an image is recorded and position the acquired base shoe part in front of a camera. For example, a below-mounted camera 592 may be secured near a floor surface, and part-transfer apparatus 512 may position the acquired base shoe part directly above, and perpendicular to, the below-mounted camera 512. Alternatively, part-transfer apparatus 512 may position the acquired base shoe part directly below, and perpendicular to, above-mounted cameras 590*a* or 594. As described above, although part-transfer apparatus 512 is illustrated to have a certain configuration depicted in FIG. 5, part-transfer apparatus may have a different configuration. For example, part-transfer apparatus 512 may have the configuration depicted in FIG. 1A. In addition, part-transfer apparatus may be comprised of a plurality of articulating arms.

If the image is recorded after the base shoe part 526 has been acquired by part-transfer apparatus, a light-emitting device 541*c* may be arranged at various positions. For example, a light-emitting device 541*c* may be incorporated into the part-transfer apparatus 512, such as behind (or incorporated into) the part-pickup tool 585, thereby providing a backlight to base shoe part 526. In addition, other light-emitting devices (e.g., 541*d*) positions throughout system 510 may illuminate a front side of a base shoe part that is acquired by part-transfer apparatus 512

Once an image has been recorded, a geometric position and rotation of the base shoe part may be determined using the previously described methods (e.g., method 310). The geometric position and rotation may then be used to determine a position of the base shoe part when the base shoe part is transferred to conveyor 596. For example, part-transfer apparatus 512 may execute a predetermined movement path each time it transfers base shoe part 526 from a part-supply station 580, or from in front of a camera (e.g., 590*a*, 592, or 594), to conveyor 596. As such, once the geometric position and rotation of the base shoe part are known, the part-transfer apparatus may determine where the base shoe part will be positioned when the predetermined movement path is executed. Alternatively, a geometric position on conveyor 596 may be predetermined, such that part-transfer apparatus 512 (or some computing device associated therewith) calculates a new movement path each time. That is, the new movement path extends from the calculated position of the base shoe part 526 (when the image is recorded) to the predetermined position on the conveyor 596. Computing device 532 may help execute various operations, such as by analyzing images and providing instructions to shoe-manufacturing equipment.

In another aspect, a 2-D recognition system may be used when base shoe part 526 has already been transferred to conveyor 596 in order to determine a geometric position and rotation of base shoe part 526 as it is arranged on conveyor 596. As such, conveyor 596 may move base shoe part along an assembly line and to a position that is beneath an above-mounted camera (e.g., 594). Once an image has been recorded by the above-mounted camera and a position of base shoe part has been determined, other shoe parts may be transferred and attached to the base shoe part.

As such, in a further aspect, a 2-D recognition system may be used after the initial stage to enable a part-transfer apparatus to position an attachment shoe part. An attachment shoe part refers to a shoe part that is to be attached to a base shoe part. Accordingly, in FIG. 2 part 224 may be deemed an attachment shoe part that is to be attached to shoe part 226.

Figure 6:
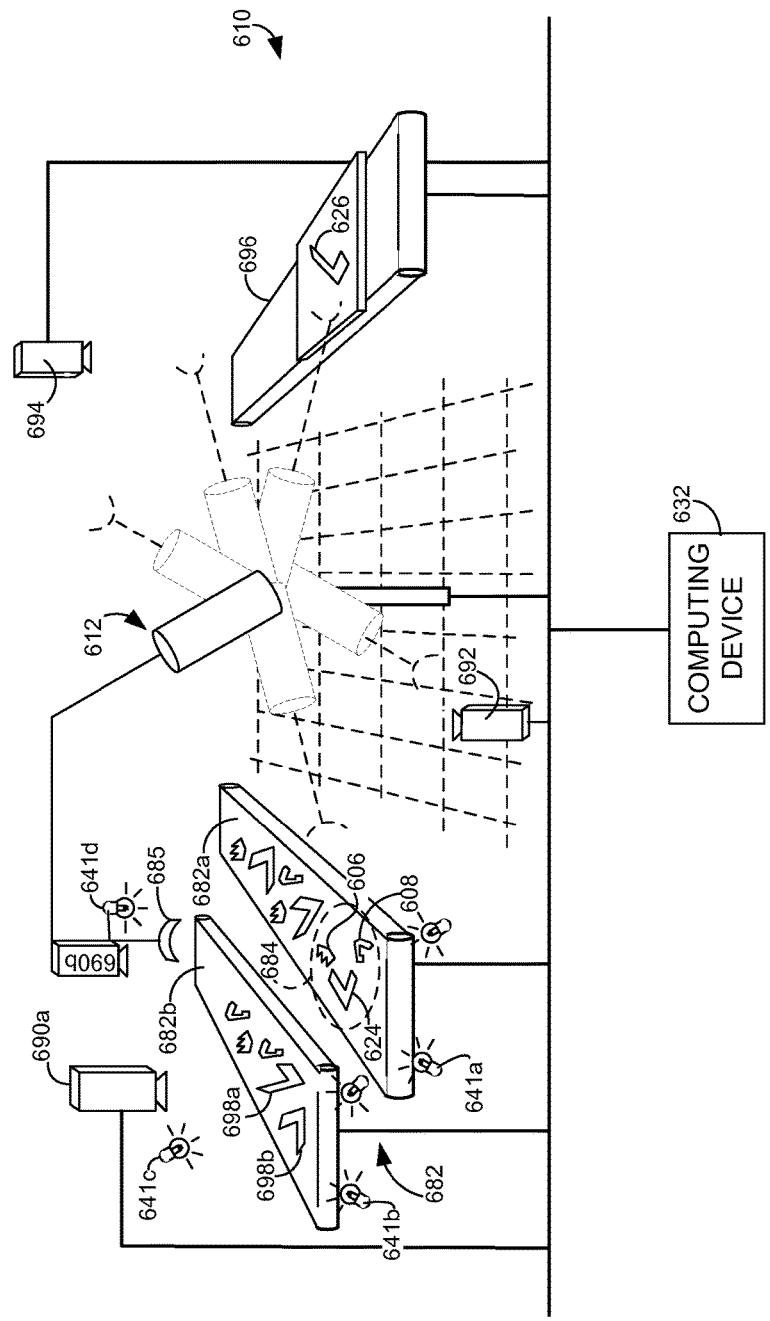

Referring to FIG. 6, a system 610 is depicted in which a 2-D recognition system may be used to position an attachment part 624, such as when the attachment shoe part 624 is initially stored at a part-supply station 682, which may be arranged into various configurations. As previously described, a part-supply station 682 may comprise a set of stacked shoe parts from which part-transfer apparatus 612 acquires a topmost attachment shoe part. Alternatively, the part-supply station 682 may be comprised of a set of conveyors 682a and 682b, one of which transfers the attachment shoe part 624 to a pickup location 684 at which part-transfer apparatus 612 may acquire the attachment shoe part 624.

As previously described, part-transfer apparatus 612 may have a part-pickup tool 685. Although part-transfer apparatus 612 is illustrated to have a certain configuration depicted in FIG. 6, part-transfer apparatus may have a different configuration, such as the configuration depicted in FIG. 1A, or a configuration comprising a plurality of articulating arms that enable movement of a camera (or an acquired shoe part) to a desired angle or position.

The attachment shoe part 624 may be provided at the supply station 682 among a plurality of different attachment shoe parts (e.g., 606 and 608), each of which may be attached to a respective portion of base shoe part 626. As such, 2-D recognition system may execute a part-selection protocol, which allows the system to identify and select a desired attachment part.

In an exemplary part-selection protocol, the 2-D recognition system may be programmed to follow a predetermined order of attachment parts—i.e., attach first part 624, followed by second part 608, followed by third part 606, etc. Accordingly, the 2-D recognition system may record images of all of the parts arranged among the plurality, identify each part (e.g., based on datastore 220), and determine a geometric location of each part as it is positioned at supply station 682. Once this position information has been determined by the 2-D recognition system, part-transfer apparatus 612 may acquire and attach each part in the predetermined order.

In another part-selection protocol, the 2-D recognition system may be programmed to transfer and attach a set of parts, regardless of the order—i.e., attach first, second, and third parts in any order. Accordingly, once images of each part (e.g., 606, 608, and 624) have been analyzed to determine a geometric position, part-transfer apparatus 612 may acquire the parts in a variety of orders, as long as all of the parts are transferred to the base part 626 at some point. Moreover, the 2-D recognition system may be programmed to retrieve the parts that are positioned in a manner that allows for the most efficient transfer from the supply station 682 to base shoe part 626. For example, if two first parts 698a and 698b are provided at the supply station and one of the first parts 698a is closer than the other first part 698b (based on respective geometric coordinates), the part-transfer apparatus 612 may be instructed to pick up the closer first part 698a instead of the other first part 698b. Similarly, if a first part 698a is rotated to a degree that may need less adjustment (relative to another first part 698b) in order to be attached to base part 626, the part-transfer apparatus 612 may be instructed to pick up the first part 698a. Computing device 632 may help execute various operations, such as by executing certain steps in a part-selection protocol, analyzing images, and providing instructions to shoe-manufacturing equipment.

In another exemplary aspect, parts 606, 608, and 624 may be arranged at part-pickup location 684 in a pre-determined configuration, such that coordinates of the pre-determined configuration may be provided to apparatus 612 to assist with part selection. That is, if a coordinate of each part 606, 608, and 624 is pre-determined based on how the group of parts are to be arranged (prior to being picked up), then a coordinate may not have to be calculated based on images. Or, a pre-determined coordinate may be used as a check to confirm that a calculated coordinate is accurate (e.g., within a threshold amount away from the pre-determined coordinate).

In a further aspect, a pre-determined arrangement of parts 606, 608, and 624 at part-pickup location 684 may match an arrangement of the parts 606, 608, and 624 when the parts are attached to base part 626. That is, each of parts 606, 608, and 624 may be spaced apart from one another and rotated in a manner that matches a spacing and rotation of each part when attached to base part 626. As such, parts 606, 608, and 624 may be picked up, placed, and/or attached as a collective group (i.e., more than one at a time) in a manner that maintains the pre-determined arrangement (i.e., maintains the spacing and rotation).

When an image is recorded of an attachment shoe part 624 to determine an orientation of the attachment shoe part 624, the camera may be positioned in various locations. As previously described, if the attachment shoe part 624 is positioned at the supply station 682 when the image is captured, the camera (e.g., 690b) may be coupled directly to part-transfer apparatus 612, or may be an above-mounted camera 690a. Camera 690b or 690a may be perpendicularly oriented from shoe part 624 when the image is recorded. For example, part-transfer apparatus 612 may be comprised of one or more articulating arms that position camera 690b above and perpendicular to shoe part 624.

Moreover, light-emitting devices may be arranged throughout system 610 to illuminate shoe part 624 when positioned at part-supply station 682. For example, a light-emitting device 641a or 641b may be positioned adjacent to, or integrated into, the supply station 682 in order to backlight the attachment shoe parts positioned on conveyors 682a and 682b. Also, light-emitting devices 641c may be positioned in a space surrounding part-supply station 682 to illuminate a front side of shoe part 624.

If the attachment shoe part 624 is retained by part-transfer apparatus 612 when the image is captured, the camera may be mounted remotely from the part-transfer apparatus 612, such as camera 690a, 692, or 694. In such an arrangement, shoe-transfer apparatus 612 may position the attachment shoe part in front of (e.g., perpendicular to a field of view of) camera 690a, 692, or 694. Moreover, a light-emitting device 641d may be integrated into the part-transfer apparatus 612, such as behind the part-pickup tool 685, in order to illuminate the acquired shoe parts when the image is captured.

Although some of the above methods describe analyzing a single image to determine an orientation, multiple images of a single part, which are recorded by one or more cameras, may be analyzed to derive a set of geometric coordinates that are believed to accurately represent a position of a shoe part.

In such a system, the set of geometric coordinates may be averaged or otherwise combined to arrive at a final geometric coordinate.

Figure 7:
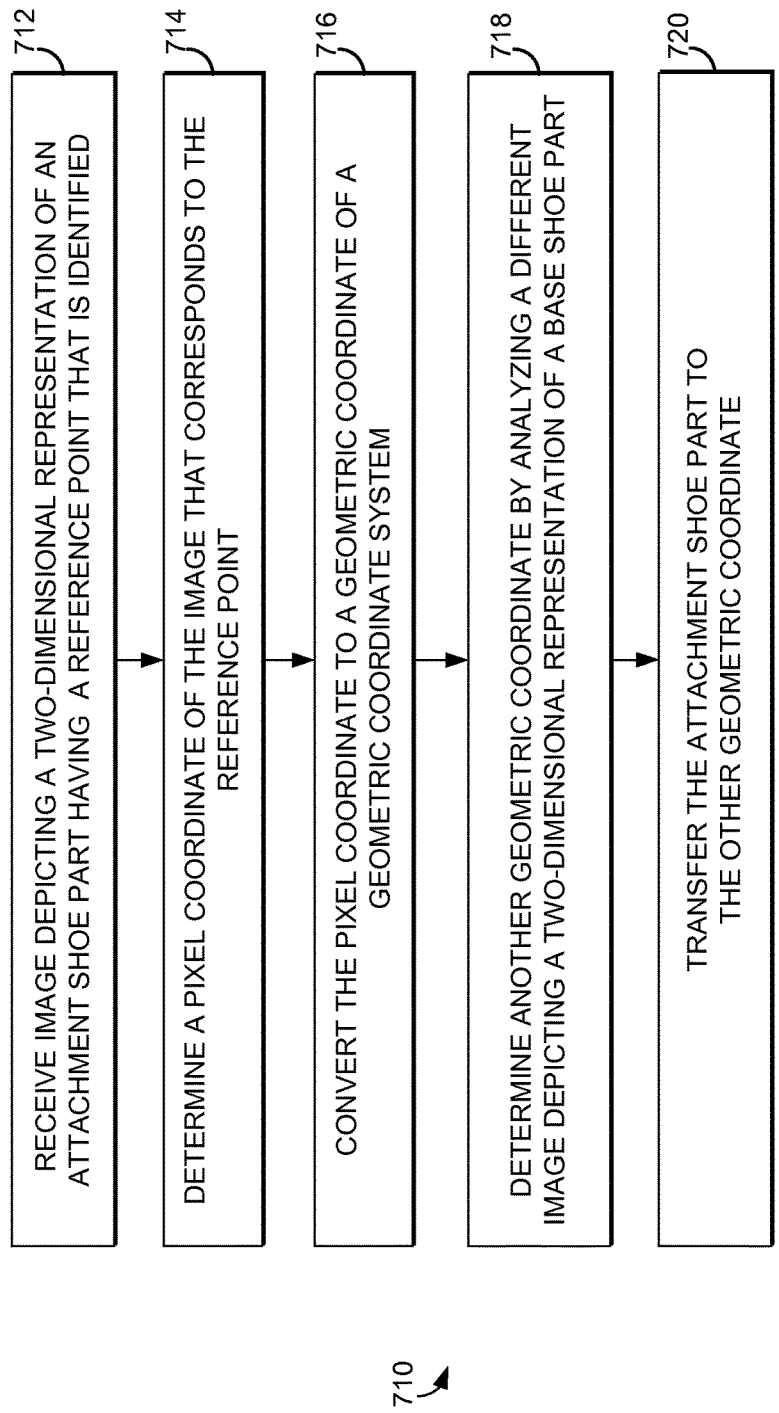
FIGS. 7 and 8 depict a respective flow diagram of a method for analyzing an image of a shoe part.

Referring now to FIG. 7, a flow diagram is depicted of a method 710 for positioning a shoe part in an automated manner during a shoe-manufacturing process. In describing FIG. 7, reference is also be made to FIG. 2. In addition, method 710, or at least a portion thereof, may be carried out when a computing device executes a set of computer-executable instructions stored on computer storage media.

At step 712 an image (e.g., 228) may be received depicting a two-dimensional representation (e.g., 232) of an attachment shoe part (e.g., 224), which is to be attached to a base shoe part (e.g., 226), wherein the two-dimensional representation of the attachment shoe part comprises a plurality of reference features 258. At step 714, pixel coordinates of the image (e.g., coordinate of system 256) are identified that correspond to the reference features. Step 716 converts the pixel coordinates of the image to a geometric coordinate (e.g., 205) of a geometric coordinate system (e.g., 225), which maps a three-dimensional space within which the attachment shoe part (e.g., 224) is positioned and a part-transfer apparatus (e.g., 212) operates. Further, at step 718, another geometric coordinate (e.g., 203) of the geometric coordinate system (e.g., 225) is determined by analyzing a different image (e.g., 230) depicting a two-dimensional representation (e.g., 233) of the base shoe part (e.g., 226) to which the attachment shoe part (e.g., 224) will be attached. Step 720 transfers, by the part-transfer apparatus (e.g., 212), the attachment shoe part (e.g., 224) to the other geometric coordinate (e.g., 203), thereby moving the attachment shoe part to a location in the three-dimensional space at which the attachment shoe part is to be attached to the base shoe part.

Figure 8:
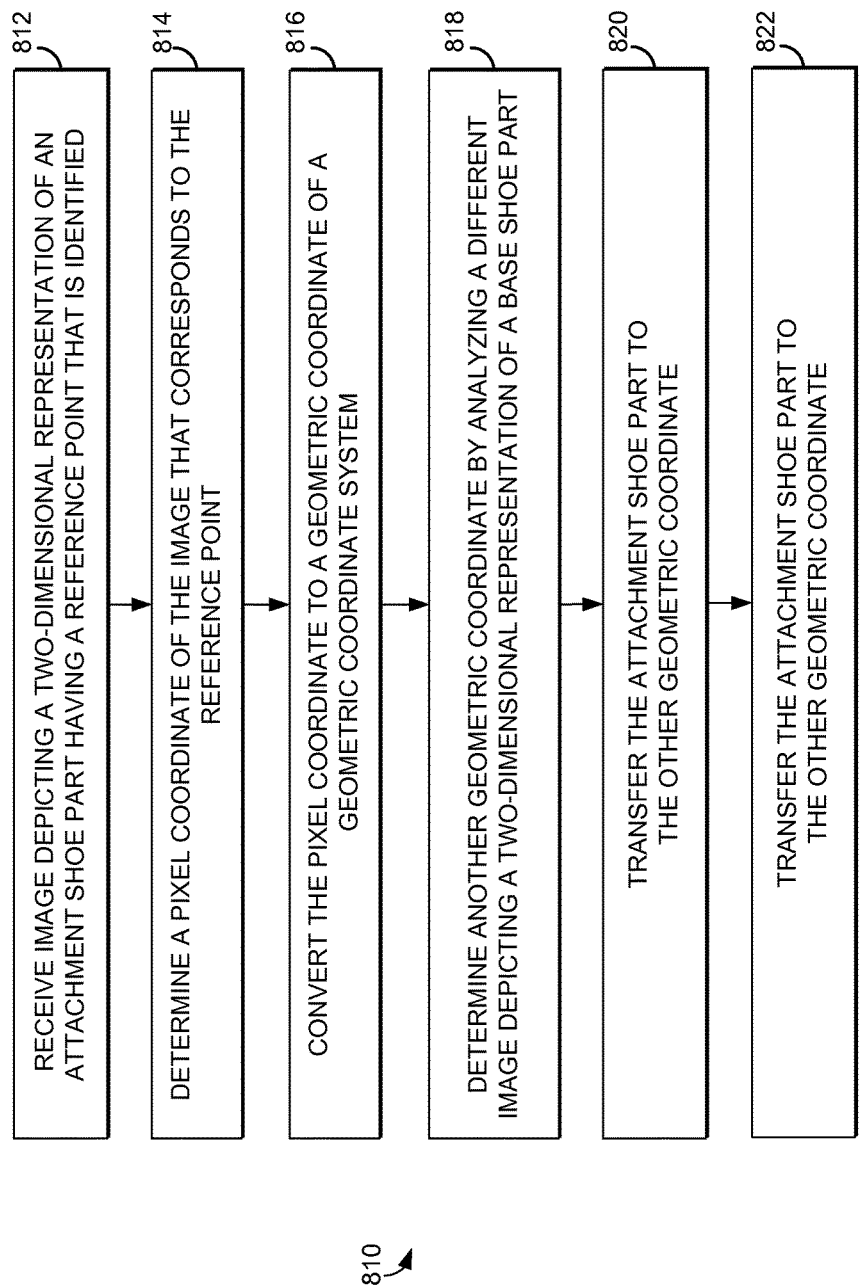

Referring now to FIG. 8, another flow diagram is depicted of a method 810 for positioning a shoe part in an automated manner during a shoe-manufacturing process. In describing FIG. 8, reference is also be made to FIG. 2. In addition, method 810, or at least a portion thereof, may be carried out when a computing device executes a set of computer-executable instructions stored on computer storage media.

At step 812 an image (e.g., 228) is received depicting a two-dimensional representation (e.g., 232) of an attachment shoe part (e.g., 224), which is to be attached to a base shoe part (e.g., 226), wherein the two-dimensional representation of the attachment shoe part comprises at least one reference feature 258. At step 814, pixel coordinates of the image (e.g., coordinate of system 256) are identified that correspond to the at least one reference feature 258. Step 816 converts the pixel coordinates of the image to a geometric coordinate (e.g., 205) of a geometric coordinate system (e.g., 225), which maps a three-dimensional space within which the attachment shoe part (e.g., 224) is positioned and a part-transfer apparatus (e.g., 212) operates. Furthermore, step 818 determines a plurality of other geometric coordinates (e.g., 203 and 202) in the geometric coordinate system by analyzing a different image (e.g., 230) depicting a two-dimensional representation (e.g., 233) of the base shoe part (e.g., 226) to which the attachment shoe part (e.g., 224) will be attached. The plurality of other geometric coordinates may comprise a part-position coordinate (e.g., 203) and a part-attachment coordinate (e.g., 201). Step 820 transfers, by the part-transfer apparatus, the attachment shoe part (e.g., 224) to the part-position coordinate (e.g., 203), and step 822 attaches the attachment shoe part to the base part at the part-attachment coordinate (e.g., 201).

The 2-D recognition system described above may also be used for quality control purposes. For instance, the 2-D recognition system may allow for detection of a mismatched attachment part in a set of matching stacked attachment parts. Further, the 2-D recognition system may also enable quality control of shoe-part positioning to ensure position placement accuracy.

Figure 9:
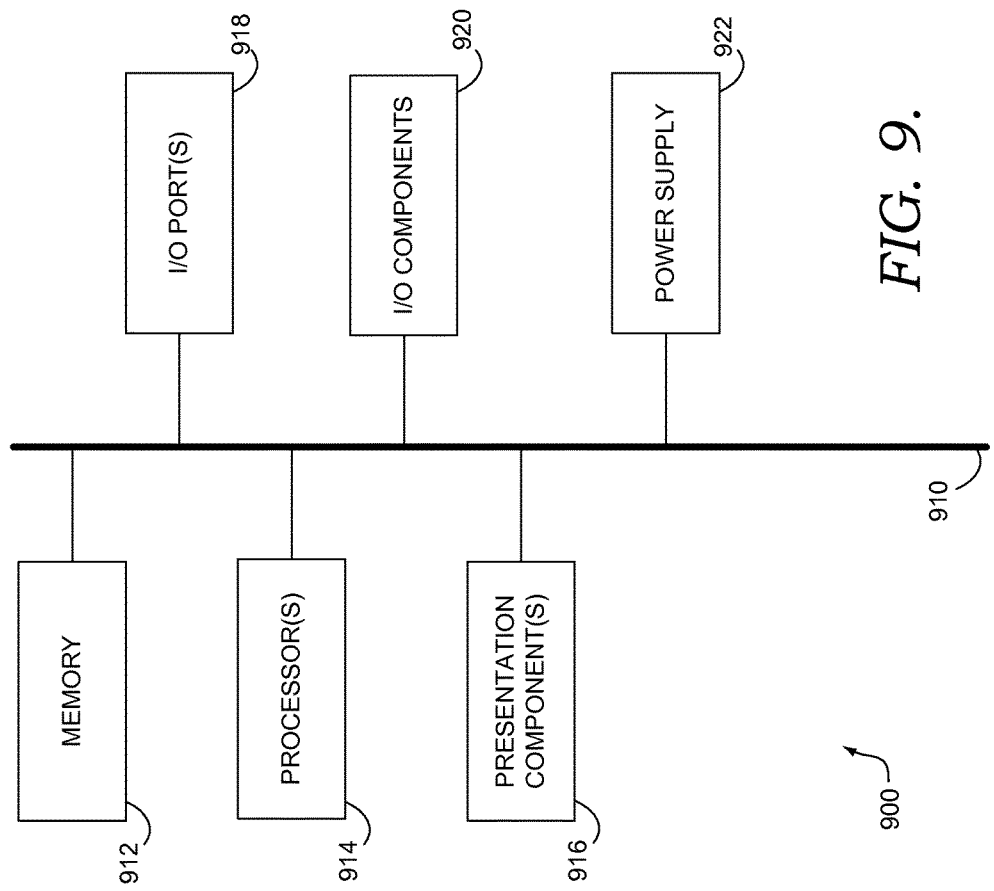
FIG. 9 depicts a block diagram of an exemplary computing device that may be used with systems and methods in accordance with the present invention.

As described above, our technology may comprise, among other things, a method, a system, or a set of instructions stored on one or more computer-readable media. Information stored on the computer-readable media may be used to direct operations of a computing device, and an exemplary computing device 900 is depicted in FIG. 9. Computing device 900 is but one example of a suitable computing system and is not intended to suggest any limitation as to the scope of use or functionality of invention aspects. Neither should the computing system 900 be interpreted as having any dependency or requirement relating to any one or combination of components illustrated. Moreover, aspects of the invention may also be practiced in distributed computing systems where tasks are performed by separate or remote-processing devices that are linked through a communications network.

Computing device 900 has a bus 910 that directly or indirectly couples the following components: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, processors may have memory.

Computing device 900 typically may have a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 900.

Memory 912 is comprised of tangible computer-storage media in the form of volatile and/or nonvolatile memory. Memory 912 may be removable, nonremovable, or a combination thereof. Exemplary hardware devices are solid-state memory, hard drives, optical-disc drives, etc.

Computing device 900 is depicted to have one or more processors 914 that read data from various entities such as memory 912 or I/O components 920. Exemplary data that is read by a processor may be comprised of computer code or machine-useable instructions, which may be computer-executable instructions such as program modules, being executed by a computer or other machine. Generally, program modules such as routines, programs, objects, components, data structures, etc., refer to code that perform particular tasks or implement particular abstract data types.

Presentation component(s) 916 present data indications to a user or other device. Exemplary presentation components are a display device, speaker, printing component, light-emitting component, etc. I/O ports 918 allow computing device 900 to be logically coupled to other devices including I/O components 920, some of which may be built in.

In the context of shoe manufacturing, a computing device 900 may be used to determine operations of various shoe-manufacturing tools. For example, a computing device may be used to control a part-pickup tool or a conveyor that transfers shoe parts from one location to another. In addition, a computing device may be used to control a part-attachment device that attaches (e.g., welds, adheres, stitches, etc.) one shoe part to another shoe part.

B. Assembling Shoe Parts Using a Multi-Functional Manufacturing Tool

Aspects of the present invention also relate to systems, methods, and apparatus for a manufacturing tool. The manufacturing tool is highly adaptable for use with a variety of materials, a variety of shapes, a variety of part sizes, a variety of manufacturing processes, and a variety of locations within an automated manufacturing system. This high level of adaptability provides a manufacturing tool that is a critical component in an automated manufacturing process. To accomplish this, the manufacturing tool is comprised of a vacuum tool and an ultrasonic welder as a unified manufacturing tool that is able to be manipulated from a single positional member. The manufacturing tool may be used to pick and position a manufacturing part such as a shoe part that is then welded or tacked with the associated ultrasonic welder.

Figure 10:
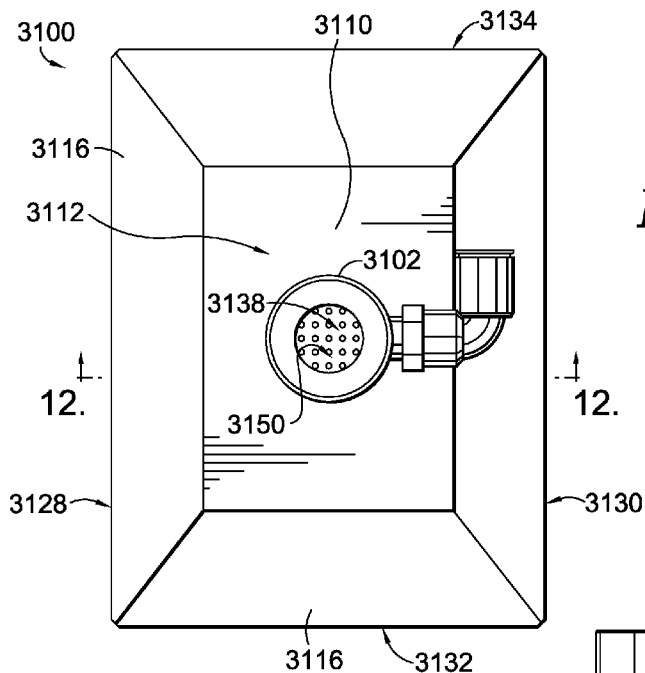
FIG. 10 depicts a top-down view of an exemplary vacuum tool, in accordance with embodiments of the present invention.

FIG. 10 depicts a top-down view of an exemplary vacuum tool 3100, in accordance with embodiments of the present invention. In various aspects, the vacuum tool 3100 may also be referred to as a vacuum-powered part holder, a manufacturing tool, a multi-functional manufacturing tool, a part-pickup tool/apparatus, and/or a part-transfer tool/apparatus; all terms are used interchangeably herein. For example, the vacuum tool 3100 may be useable in an automated (or partially automated) manufacturing process for the movement, positioning, and/or maintaining of one or more parts. The parts manipulated by the vacuum tool 3100 may be rigid, malleable, or any combination of characteristics (e.g., porous, non-porous). In an exemplary aspect, the vacuum tool 3100 is functional for picking and placing a part constructed, at least in part, of leather, polymers, textiles, rubber, foam, mesh, and/or the like.

The material to be manipulated by a vacuum tool may be of any type. For example, it is contemplated that a vacuum tool described herein is adapted for manipulating (e.g., picking and placing) flat, thin, and/or lightweight parts of various shapes, materials, and other physical characteristics (e.g. pattern cut textiles, non-woven materials, mesh, plastic sheeting material, foams, rubber). Therefore, unlike industrial-scaled vacuum tools functional for manipulating a heavy, rigid, or non-porous material, the vacuum tools provided herein are able to effectively manipulate a variety of materials (e.g., light, porous, flexible).

The vacuum tool 3100 is comprised of a vacuum generator 3102. The vacuum generator generates a vacuum force (e.g., low pressure gradient relative to ambient conditions). For example, the vacuum generator 3102 may utilize traditional vacuum pumps operated by a motor (or engine). The vacuum generator 3102 may also utilize a venturi pump to generate a vacuum. Further yet, it is contemplated that an air amplifier, which is also referred to as a coandă effect pump, is also utilized to generate a vacuum force. Both the venturi pump and the coandă effect pump operate on varied principles of converting a pressurized gas into a vacuum force effective for maintaining a suction action. While the following disclosure will focus on the venturi pump and/or the coandă effect pump, it is contemplated that the vacuum generator 3102 may also be a mechanical vacuum that is either local or remote (coupled by way of tubing, piping, and the like) to the vacuum tool 3100.

The vacuum tool 3100 of FIG. 1 is also comprised of a vacuum distributor 3110. The vacuum distributor 3110 distributes a vacuum force generated by the vacuum generator 3102 across a defined surface area. For example, a material to be manipulated by the vacuum tool 3100 may be a flexible material of several square inches in surface area (e.g., a leather portion for a shoe upper). As a result of the material being at least semi-flexible, the vacuum force used to pick up the part may be advantageously dispersed across a substantial area of the part. For example, rather than focusing a suction effect on a limited surface area of a flexible part, which may result in bending or creasing of the part once support underneath of the part is removed (e.g., when the part is lifted), dispersing the suction effect across a greater area may inhibit an undesired bending or creasing of the part. Further, it is contemplated that a concentrated vacuum (non-dispersed vacuum force) may damage a part once a sufficient vacuum is applied. Therefore, in an aspect of the present invention, the vacuum force generated by the vacuum generator 3102 is distributed across a larger potential surface area by way of the vacuum distributor 3110.

In an exemplary aspect, the vacuum distributor 3110 is formed from a semi-rigid to rigid material, such as metal (e.g., aluminum) or polymers. However, other materials are contemplated. The vacuum tool 3100 is contemplated as being manipulated (e.g. moved/positioned) by a robot, such as a multi-axis programmable robot in response to instructions received from, for example, a part-recognition system. As such, limitations of a robot may be taken into consideration for the vacuum tool 3100. For example, weight of the vacuum tool 3100 (and/or a manufacturing tool 3310 to be discussed hereinafter) may be desired to be limited in order to limit the potential size and/or costs associated with a manipulating robot. Utilizing weight as a limiting factor, it may be advantageous to form the vacuum distributor in a particular manner to reduce weight while still achieving a desired distribution of the vacuum force.

Other consideration may be evaluated in the design and implementation of the vacuum tool 3100. For example, a desired level of rigidity of the vacuum tool 3100 may result in reinforcement portions and material-removed portions, as will be discussed with respect to FIG. 26 hereinafter, being incorporated into the vacuum tool 3100.

The vacuum distributor 3110 is comprised of an exterior top surface 3112 and an exterior side surface 3116. FIG. 10 depicts a vacuum distributor with a substantially rectangular footprint. However, it is contemplated that any footprint may be utilized. For example, a non-circular footprint may be utilized. A non-circular footprint, in an exemplary aspect, may be advantageous as providing a larger useable surface area for manipulating a variety of part geometries. Therefore, the use of a non-circular footprint may allow for a greater percentage of the footprint to be in contact with a manipulated part as compared to a circular footprint. Also with respect to shape of a vacuum tool 3100 beyond the footprint, it is contemplated, as will be discussed hereinafter, that any three-dimensional geometry may be implemented for the vacuum distributor 3110. For example, an egg-like geometry, a pyramid-like geometry, a cubical-like geometry, and the like may be utilized.

The exemplary vacuum distributor 3110 of FIG. 10 is comprised of the exterior top surface 3112 and a plurality of exterior side surfaces 3116. The vacuum distributor 3110 also terminates at edges resulting in a first side edge 3128, a second parallel side edge 3130, a front edge 3132, and an opposite parallel back edge 3134.

Figure 11:
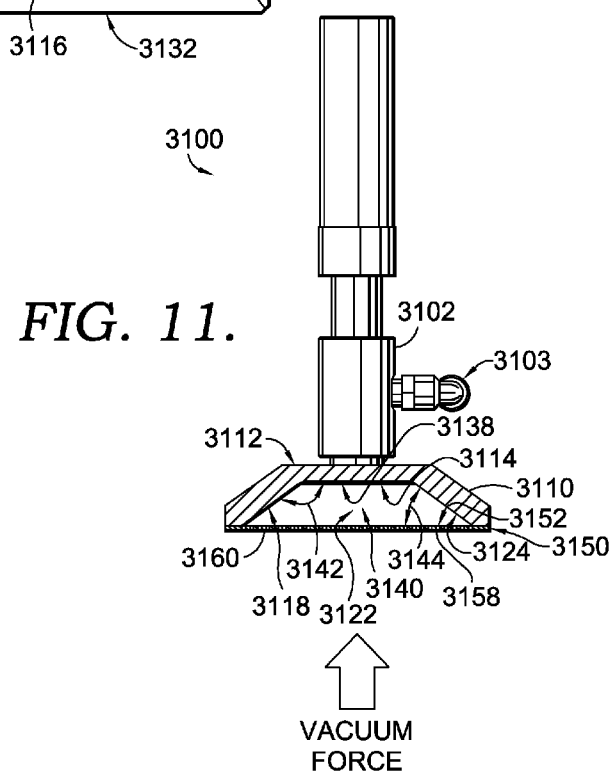
FIG. 11 depicts a front-to-back perspective cut view along a cut line that is parallel to cutline 3-3 of the vacuum tool in FIG. 10, in accordance with aspects of the present invention.

FIG. 10 depicts a cutline 12-12 demarking a parallel view perspective for FIG. 11. FIG. 11 depicts a front-to-back perspective cut view that is parallel along cut line 12-12 of the vacuum tool 3100, in accordance with aspects of the present invention. FIG. 11 depicts, among other features, a vacuum distribution cavity 3140 and a vacuum plate 3150 (also sometimes referred to as the "plate" herein). The vacuum distributor 3110 and the plate 3150, in combination, define a volume of space forming the vacuum distribution cavity 3140. The vacuum distribution cavity 3140 is a volume of space that allows for the unobstructed flow of gas to allow for an equalized dispersion of a vacuum force. In an exemplary aspect, the flow of gas (e.g., air) from the plate 3150 to the vacuum generator 3102 is focused through the utilization of angled interior side surface(s) 3118. As depicted in FIG. 11, there are four primary interior side surfaces, a first interior side surface 3120 (not shown), a second interior side surface 3122, a third interior side surface 3124, and a fourth interior side surface 3126 (not shown). However, it is contemplated that other geometries may be utilized.

The interior side surfaces 3118 extend from the interior top surface 3114 toward the plate 3150. In an exemplary aspect, an obtuse angle 3142 is formed between the interior top surface and the interior side surfaces 3118. The obtuse angle 3142 provides an air vacuum distribution effect that reduces internal turbulence of air as it passes from the plate 3150 toward a vacuum aperture 3138 serving the vacuum generator 3102. By angling the approach of air as it enters the vacuum aperture 3138, a reduced amount of material may be utilized with the vacuum distributor 3110 (e.g., resulting in a potential reduction in weight) and the flow of air may be controlled through a reduction in air turbulence. An angle 3144 may also be defined by the intersection of the interior side surfaces 3118 and the plate 3150.

The plate 3150, which will be discussed in greater detail in FIGS. 15-24 hereinafter, has an interior plate surface 3152 (i.e., top surface) and an opposite exterior plate surface 3158 (i.e., bottom surface). The exterior plate surface 3158 is adapted for contacting a part to be manipulated by the vacuum tool 3100. For example, the plate 3150 in general, or the exterior plate surface 3158 in particular, may be formed from a non-marring material. For example, aluminum or a polymer may be used to form the plate 3150 in whole or in part. Further, it is contemplated that the plate 3150 is a semi-rigid or rigid structure to resist forces exerted on it from the vacuum generated by the vacuum generator 3102. Therefore, the plate 3150 may be formed of a material having a sufficient thickness to resist deforming under pressures created by the vacuum generator 3102. Additionally, it is contemplated that the plate 3150 is formed from a material that conforms, in part, to an item to be manipulated. For example, the plate 3150 may be constructed from a mesh-like material having a plurality of apertures defined by voids in the mesh-like material (e.g., textile mesh, metal mesh).

When used in combination, the vacuum generator 3102, the vacuum distributor 3110, and the plate 3150, the vacuum tool 3100 is functional to generate a suction force that draws a material towards the exterior plate surface 3158 (also referred to as a manufacturing-part-contacting surface) where the material is maintained against the plate 3150 until the force applied to the material is less than a force repelling (e.g., gravity, vacuum) the material from the plate 3150. In use, the vacuum tool 3100 is therefore able to approach a part, generate a vacuum force capable of temporarily maintaining the part in contact with the plate 3150, move the vacuum tool 3100 and the part to a new location, and then allow the part to release from the vacuum tool 3100 at the new position (e.g., at a new location, in contact with a new material, at a new manufacturing process, and the like).

Figure 12:
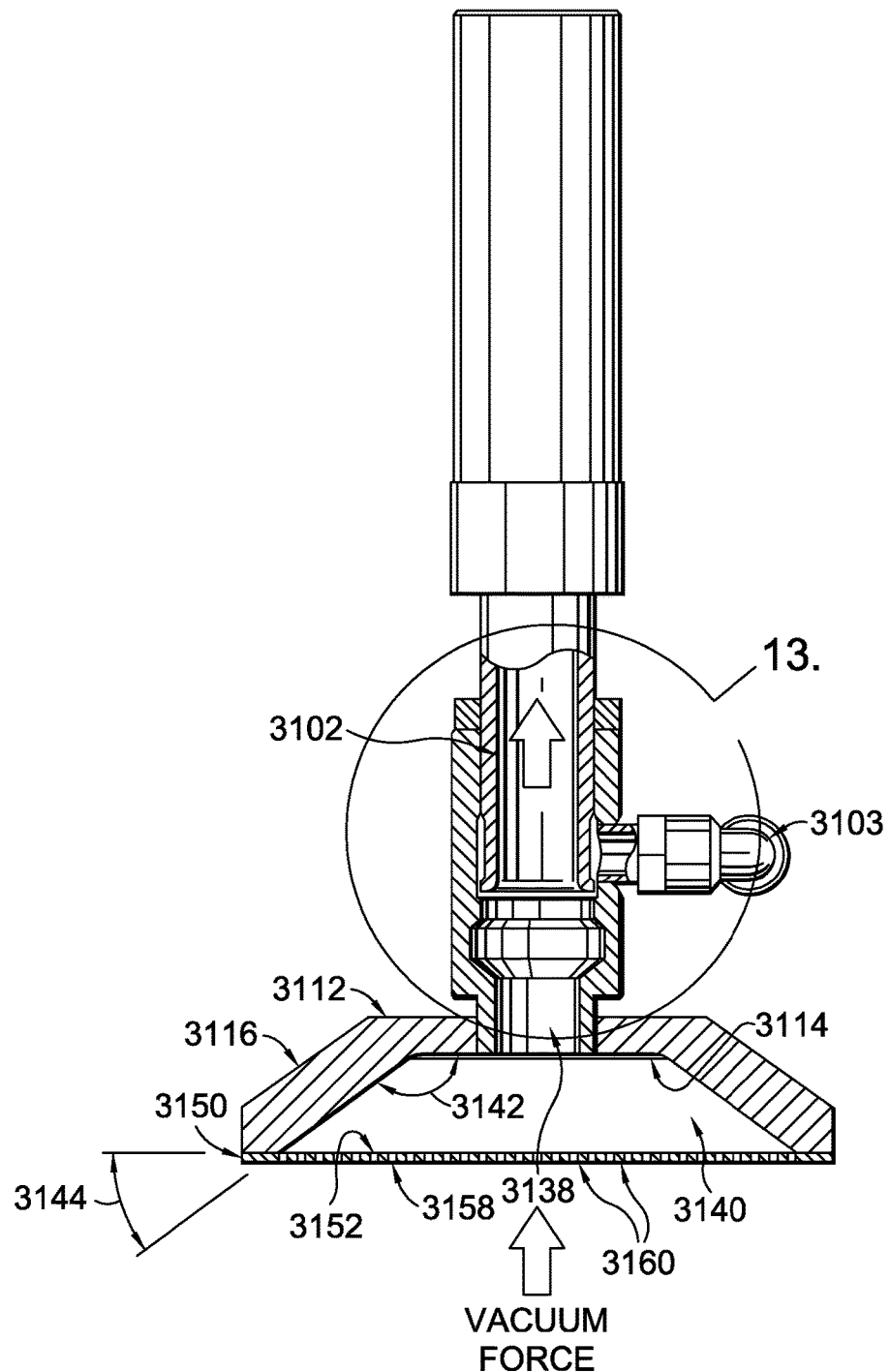
FIG. 12 depicts a front-to-back view of the vacuum tool along the cutline 3-3 of FIG. 10, in accordance with aspects of the present invention.

FIG. 12 depicts a front-to-back view of the vacuum tool 3100 along the cutline 12-12 of FIG. 10, in accordance with aspects of the present invention. In particular, FIG. 12 provides a cut view of the vacuum generator 3102. As will be discussed in greater detail with respect to FIG. 13, the vacuum generator 3102, in the exemplary aspect, is an air amplifier utilizing a coandă effect to generate a vacuum force.

In this example, air is drawn from the exterior plate surface 3158 through a plurality of apertures 3160 through the plate 3150 to the vacuum distribution cavity 3140. The vacuum distribution cavity 3140 is enclosed between the vacuum distributor 3110 and the plate 3150, such that if the plate 3150 is a non-porous (i.e., lacked the plurality of apertures 3160) surface, then an area of low pressure would be generated in the vacuum distribution cavity 3140 when the vacuum generator 3102 is activated. However, returning to the example including the plurality of apertures 3160, the air is drawn into the vacuum distribution cavity 3140 towards the vacuum aperture 3138, which then allows the air to be drawn into the vacuum generator 3102.

Figure 13:
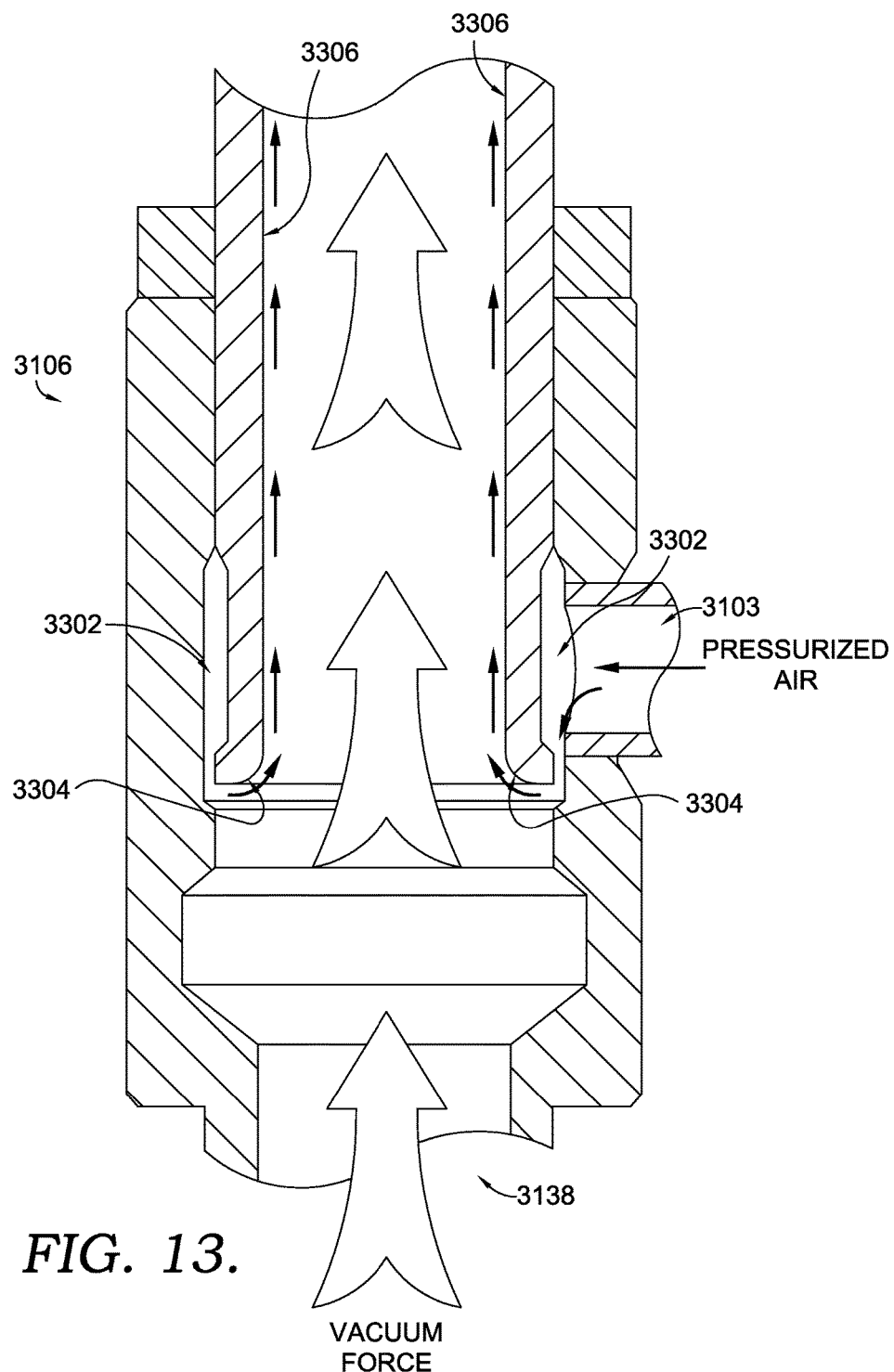
FIG. 13 depicts a focused view of the vacuum generator as cut along the cutline 3-3 from FIG. 10, in accordance with aspects of the present invention.

FIG. 13 identifies a zoomed view of the vacuum generator 3102 depicted in FIG. 12. FIG. 13 depicts a focused view of the vacuum generator 3102 as cut along the cutline 12-12 from FIG. 10, in accordance with aspects of the present invention. The vacuum generator depicted in FIG. 13 is a coandă effect (i.e., air amplifier) vacuum pump 3106. The coandă effect vacuum pump injects pressurized air at an inlet 3103. The inlet 3103 directs the pressurized air through an internal chamber 3302 to a sidewall flange 3304. The pressurized air, utilizing the coandă effect, curves around the sidewall flange 3304 and flows along an internal sidewall 3306. As a result of the pressurized air movement, a vacuum force is generated in the same direction as the flow of the pressurized air along the internal sidewall 3306. Consequently, a direction of suction extends up through the vacuum aperture 3138.

Figure 14:
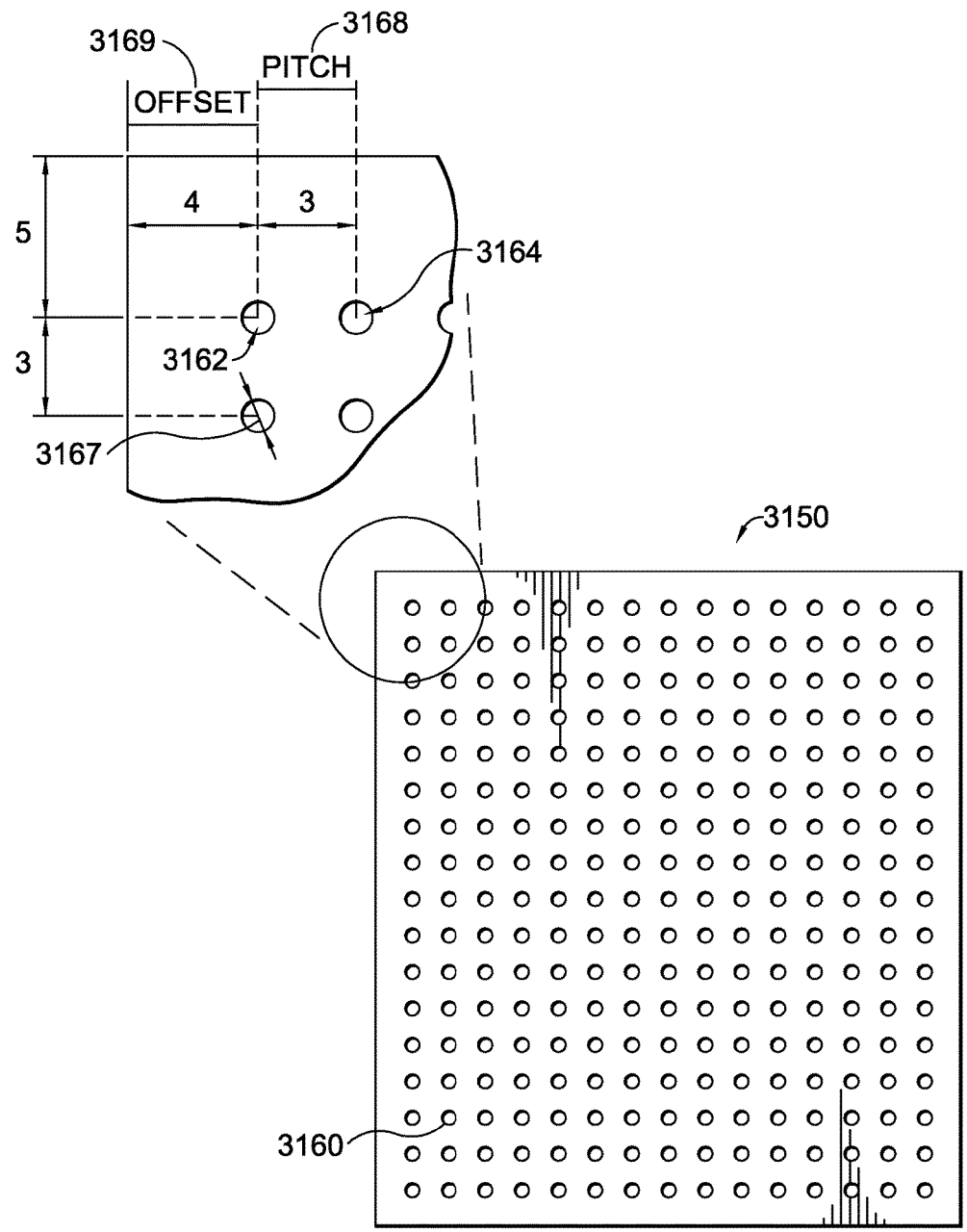
FIG. 14 depicts an exemplary plate comprised of the plurality of apertures, in accordance with aspects of the present invention.

FIG. 14 depicts an exemplary plate 3150 comprised of the plurality of apertures 3160, in accordance with aspects of the present invention. While the plate 3150 is illustrated as having a rectangular footprint, as previously discussed, it is contemplated that any geometry may be implemented (e.g., circular, non-circular) depending, in part, on the material to be manipulated, a robot or positional member controlling the vacuum tool 3100, and/or components of the vacuum tool 3100.

The plurality of apertures 3160 may be defined, at least in part, by a geometry (e.g., circular, hatch, bulbous, rectangular), size (e.g., diameter, radius (e.g., radius 3167), area, length, width), offset (e.g., offset 3169) from elements (e.g., distance from outer edge, distance from a non-porous portion), and pitch (e.g., distance between apertures (e.g., pitch 3168)). The pitch of two apertures is defined as a distance from a first aperture (e.g., first aperture 3162) to a second aperture (e.g., second aperture 3164). The pitch may be measured in a variety of manners. For example, the pitch may be measured from the closest two points of two apertures, from the surface area center of two apertures (e.g., centre of circular apertures), and/or from a particular feature of two apertures.

Depending on desired characteristics of a vacuum tool, the variables associated with the apertures may be adjusted. For example, a non-porous material of low density may not require much vacuum force to maintain the material in contact with the vacuum tool under normal operating conditions. However, a large porous mesh material may, on the other hand, require a significant amount of vacuum force to maintain the material against the vacuum tool under normal operating conditions. Therefore, to limit the amount of energy placed into the system (e.g., amount of pressurized air to operate a coandă effect vacuum pump, electricity to operate a mechanical vacuum pump) an optimization of the apertures may be implemented.

For example, a variable that may be sufficient for typical materials handled in a footwear, apparel, and the like industry may include, but not be limited to, apertures having a diameter between 0.5 and 5 millimeters (mm), between 1 mm and 4 mm, between 1 mm and 3 mm, 1.5 mm, 2 mm, 2.5 mm, 3 mm, and the like. However, larger and smaller diameter (or comparable surface area) apertures are contemplated. Similarly, the pitch may range between 1 mm and 8 mm, between 2 mm and 6 mm, between 2 mm and 5 mm, 3 mm, 3.5 mm, 4 mm, 4.5 mm, 5 mm, 5.5 mm, 6 mm, and the like. However, larger and smaller pitch measurements are contemplated.

Additionally, it is contemplated that a variable size and a variable pitch may be implemented in aspects of the present invention. For example, a compound part composed of both a porous material portion and a non-porous material portion may utilize different variables to accomplish the same level of manipulation. In this example, variables that lead to a reduction in necessary vacuum force in an area to be contacted by the non-porous material and variables that lead to higher vacuum forces in an area to be contacted by the porous material may be implemented. Further, a vision system or other part-identification system may be used in conjunction to further ensure a proper placement of the material with respect to the plurality of apertures. Additionally, it is contemplated that a relationship between pitch and size may be utilized to locate the plurality of apertures. For example, a pitch from a larger-sized aperture may be greater than a pitch from a smaller-sized aperture (or vice versa).

An additional variable is the offset. In an exemplary aspect, the offset is a distance of an aperture from an outside edge of the plate 3150. Different apertures may have different offsets. Further different edges may implement different offsets. For example an offset along a front edge may be different from an offset along a side edge. The offset may range from no offset to 8 mm (or more). In practice, an offset ranging from 1 mm to 5 mm may accomplish characteristics of exemplary aspects of the present invention.

The plurality of apertures 3160 may be formed in the plate 3150 utilizing a number of manufacturing techniques. For example apertures may be punched, drilled, etched, carved, melted, and/or cut from the plate 3150. In an exemplary embodiment, the plate 3150 is formed from a material that is responsive to laser cutting. For example polymer-based materials and some metal-based materials may be used in conjunction with laser cutting of the plurality of apertures.

Figure 15:
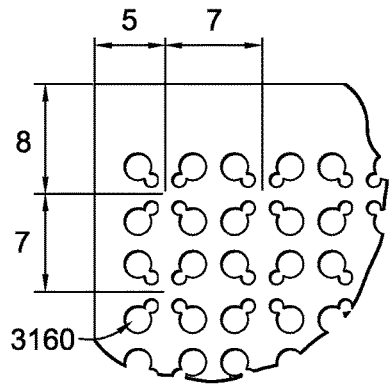
FIGS. 15-24 depict various aperture variations in a plate, in accordance with aspects of the present invention.
Figure 16:
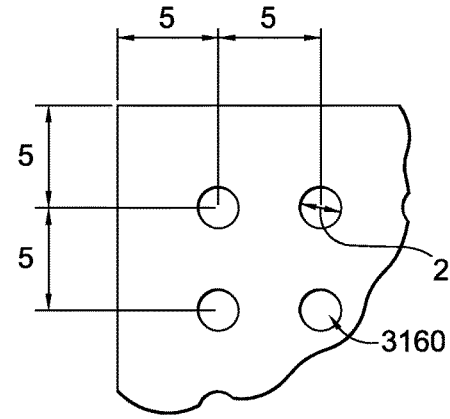
Figure 17:
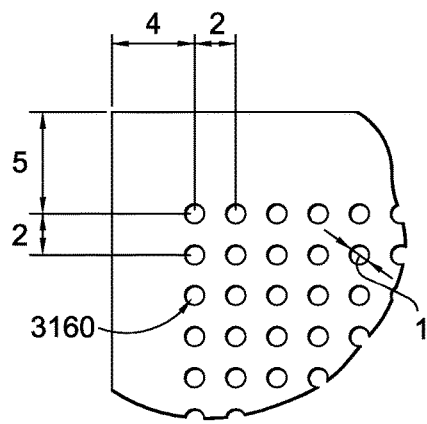
Figure 18:
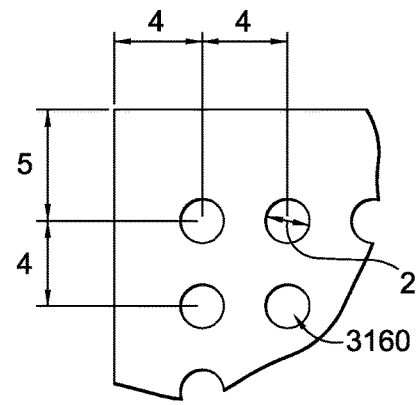
Figure 19:
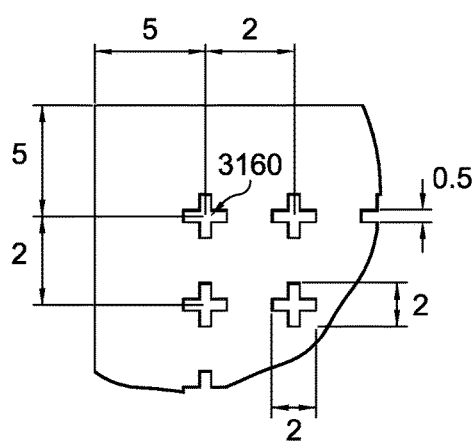
Figure 20:
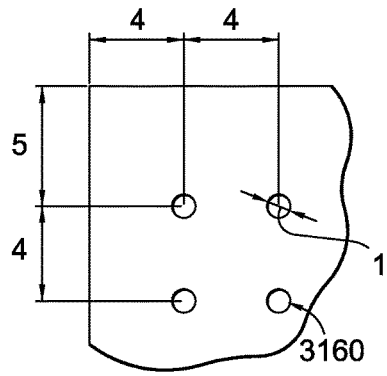
Figure 21:
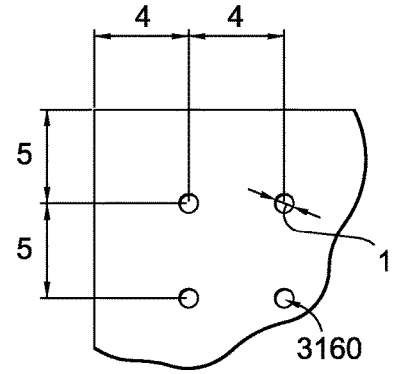
Figure 22:
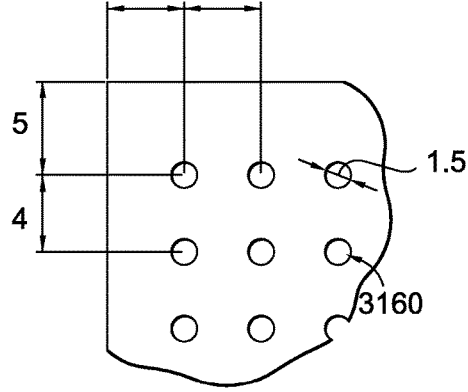
Figure 23:
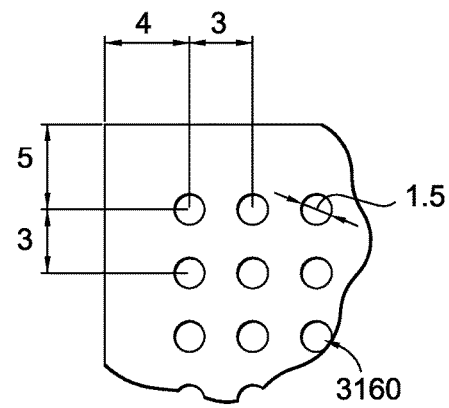
Figure 24:
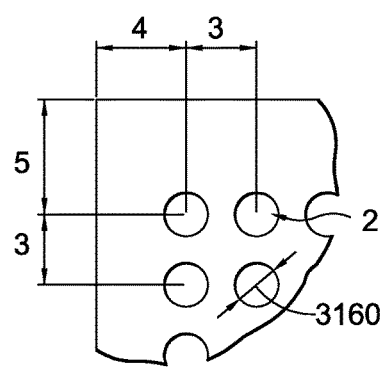

FIGS. 15-24 provide exemplary aperture variable selections similar to that discussed with respect to FIG. 14, in accordance with aspects of the present invention. The following examples are not intended to be limiting, but instead exemplary in nature. FIG. 15 depicts non-circular apertures having a first offset of 5 mm and a second offset of 8 mm and a pitch of 7 mm. FIG. 16 depicts circular apertures having an offset and pitch of 5 mm with a diameter of 2 mm. FIG. 17 depicts circular apertures having a diameter of 1 mm, a pitch of 2 mm, and offsets of 4 mm and 5 mm. FIG. 18 depicts circular apertures having a diameter of 2 mm, a pitch of 4 mm, and offsets of 5 mm and 4 mm. FIG. 19 depicts exemplary geometric apertures having a pitch of 4 mm and offsets of 5 mm. FIG. 20 depicts circular apertures having a diameter of 1 mm, a pitch of 4 mm, and offsets of 5 mm and 4 mm. FIG. 21 depicts circular apertures having a diameter of 1 mm, a pitch of 5 mm, and offsets of 5 mm. FIG. 22 depicts circular apertures having a diameter of 1.5 mm, a pitch of 4 mm, and offsets of 5 mm and 4 mm. FIG. 23 depicts circular apertures having a diameter of 1.5 mm, a pitch of 3 mm, and offsets of 4 mm. FIG. 24 depicts circular apertures having a diameter of 2 mm, a pitch of 3 mm, and offsets of 5 mm and 4 mm. As previously discussed, it is contemplated that shape, size, pitch, and offset may be altered uniformly or variably in any combination to achieve a desired result.

Figure 25:
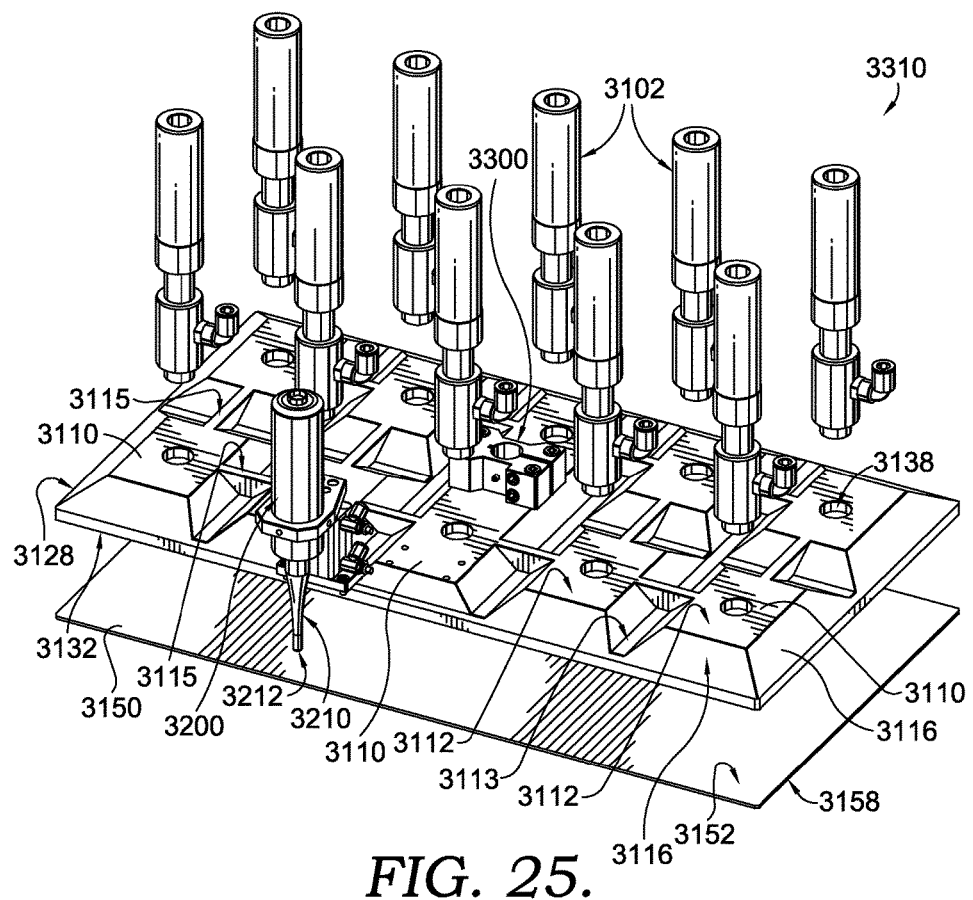
FIG. 25 depicts an exploded view of a manufacturing tool comprised of a vacuum tool and an ultrasonic welder, in accordance with aspects of the present invention.

FIG. 25 depicts an exploded view of a manufacturing tool 3310 comprised of a vacuum tool 3100 and an ultrasonic welder 3200, in accordance with aspects of the present invention. Unlike the vacuum tool 3100 discussed with respect to FIGS. 10 and 11, the vacuum tool 3100 of FIG. 25 incorporates a plurality of vacuum generators 3102, vacuum distributors 3110, and vacuum distribution cavities 3140 into a unified vacuum tool 3100. As will be discussed hereinafter, advantages may be realized by the ability to selectively activate/deactivate vacuum force in individual portions of the vacuum tool 3100. Additionally, a greater control of continuous vacuum force may be achieved by having segregated portions of the vacuum tool 3100.

The manufacturing tool 3310 also is comprised of a coupling member 3300. The coupling member 3300 is a feature of the manufacturing tool 3310 (or the vacuum tool 3100 or the ultrasonic welder 3200 individually) allowing a positional member (not shown) to manipulate the position, attitude, and/or orientation of the manufacturing tool 3310. For example, the coupling member 3300 may allow for the addition of the manufacturing tool to a computer-numerically-controlled (CNC) robot that has a series of instructions embodied on a non-transitory computer-readable medium, that when executed by a processor and memory, cause the CNC robot to perform a series of steps. For example, the CNC robot may control the vacuum generator(s) 3102, the ultrasonic welder 3200, and/or the position to which the manufacturing tool 3310 is located in response to instructions received from a part-recognition system. The coupling member 3300 may, therefore, allow for the temporary or permanent coupling of the manufacturing tool 3310 to a positional member, such as a CNC robot.

As was previously discussed, aspects of the present invention may form portions of the manufacturing tool 3310 with the intention of minimizing mass. As such, the plurality of vacuum distributors 3110 of FIG. 25 include reduced material portions 3113. The reduced material portions 3113 eliminate portions of what could otherwise be a uniform exterior top surface. The introduction of reduced material portions 3113 reduces weight of the manufacturing tool 3310 to allow for a potentially smaller positional member to be utilized, which may save on space and costs. Additional locations for reduced material portions 3113 are contemplated about the vacuum tool 3100 (e.g., side, bottom, top).

However, aspects of the present invention may desire to remain a level of rigidity of the plurality of vacuum distributors 3110 as supported by a single coupling member 3300. To maintain a level of rigidity while still introducing the reduced material portions 3113, reinforcement portions 3115 may also be introduced. For example, reinforcement portions 3115 may extend from one vacuum distributor 3110 to another vacuum distributor 3110. Further yet, it is contemplated that in aspects of the present invention, reinforcement portions 3115 may be included proximate to the coupling member 3300 for a similar rationale.

The plate 3150 is separated from the plurality of vacuum distributors 3110 in FIG. 25 for illustrative purposes. As a result, an interior plate surface 3152 is viewable. Traditionally, the interior plate surface 3152 is mated with a bottom portion of the plurality of vacuum distributors 3110, forming an air-tight bond.

The vacuum tool 3100 is comprised of a plurality of vacuum generators 3102, vacuum distributors 3110, and associated vacuum distribution cavities 3140. It is contemplated that any number of each may be utilized in a vacuum tool 3100. For example, it is contemplated that 10, 8, 6, 4, 2, 1, or any number of units may be combined to form a cohesive vacuum tool 3100. Further, any footprint may be formed. For example, while a rectangular footprint is depicted in FIG. 25, it is contemplated that a square, triangular, circular, non-circular, part-matching shape, or the like may instead be implemented (e.g., the units may be modular such that depending on the material to be manipulated additional units may be added or removed from the vacuum tool 3100. A coupling mechanism may couple a first vacuum distributor 3110 with one or more additional vacuum distributors 3110 to form the vacuum tool 3100). Additionally, the size of the vacuum generator 3102 and/or the vacuum distributor 3110 may be varied (e.g., non-uniform) in various aspects. For example, in an exemplary aspect, where a greater concentration of vacuum force is needed for a particular application, a smaller vacuum distributor may be utilized, and where a less concentrated vacuum force is needed, a larger vacuum distributor may be implemented.

FIGS. 25-34 depict exemplary manufacturing tools 3310; however, it is understood that one or more components may be added or removed from each aspect. For example, each aspect is comprised of an ultrasonic welder 3200 and a vacuum tool 3100, but it is contemplated that the ultrasonic welder 3200 may be eliminated all together. Similarly, it is contemplated that one or more additional ultrasonic welders 3200 may be implemented in conjunction with the various aspects. Further, it is contemplated that additional features may also be incorporated. For example, part-recognition systems, adhesive applicators (e.g., spray, roll, hot-melt, and other application methods), mechanical fastening components, pressure applicators, curing devices (e.g., ultraviolet light, infrared light, heat applicators, and chemical applicators), lasers, heat welders, arc welders, microwaves, other energy concentrating fastening devices, and the like may also be incorporated in whole or in part in exemplary aspects. For example, any of the above-referenced fastening tools (e.g., adhesive applicators, mechanical fasteners, welders, and the like) may be used in addition to or instead of an ultrasonic welder as discussed herein. Therefore, aspects contemplate alternative fastening tools used in conjunction with one or more vacuum tools.

The ultrasonic welder 3200, in an exemplary aspect, is comprised of a stack comprised of an ultrasonic welding horn 3210 (may also be referred to as a sonotrode), a converter 3220 (may also be referred to as a piezoelectric transducer), and a booster (not labeled). The ultrasonic welder 3200 may further be comprised of an electronic ultrasonic generator (may also be referred to as a power supply) and a controller. The electronic ultrasonic generator may be useable for delivering a high-powered alternating current signal with a frequency matching the resonance frequency of the stack (e.g., horn, converter, and booster). The controller controls the delivery of the ultrasonic energy from the ultrasonic welder to one or more parts.

Within the stack, the converter converts the electrical signal received from the electronic ultrasonic generator into a mechanical vibration. The booster modifies the amplitude of the vibration from the converter. The ultrasonic welding horn applies the mechanical vibration to the one or more parts to be welded in order to attach the one or more parts. The attachment may be temporary or permanent. For example, temporary attachment may be utilized to hold parts in place in anticipation of additional parts being added and/or attached. The ultrasonic welding horn is comprised of a distal end 3212 adapted for contacting a part. For example, the distal end 3212 may be formed so as to effectively transmit the mechanical vibration to the part while limiting the necessary time, pressure, and/or surface area necessary for a particular weld. For example, the distal end may be adapted to result in a welding head spot size of a particular size for the materials to be welded. The ultrasonic welding head spot size may be in a diameter range from 1 mm to 8 mm, or in particular at/about 4 mm, 4.5 mm, 5 mm, 5.5 mm, 6 mm, and/or 6.5 mm in diameter. Further, a variety ultrasonic welding frequencies may be implemented, such as 15 kHz to 70 kHz. In an exemplary aspect, the welding frequency may be 15 kHz to 35 kHz, 25 kHz to 30 kHz, 26 kHz, 27 kHz, 28 kHz, and/or 29 kHz. Various other power utilization variables may be altered. For example, power consumption may also include wattage of the ultrasonic welder. The wattage may be adjusted based on the material, time, pressure, thickness, weld penetration, etc. In an exemplary aspect, the wattage may be about 300 watts.

The ultrasonic welder 3200 may be positioned at a plurality of locations relative to the vacuum tool 3100. For example, the ultrasonic welder may be located at any location along the perimeter of the vacuum tool 3100. Further, it is contemplated that the ultrasonic welder 3200 is offset from the perimeter of the vacuum tool 3100 at any distance. In an exemplary aspect, the ultrasonic welder 3200 is located along the perimeter proximate the coupling member 3300 to minimize movement of the manufacturing tool 3310 when transitioning from vacuum to welding. Further, it is contemplated that a plurality of ultrasonic welders 3200 are utilized at a variety of locations about the vacuum tool 3100 to further reduce travel time of the manufacturing tool 3310. Further yet, it is contemplated that one or more ultrasonic welding tools are integrated into the vacuum tool 3100. For example, an ultrasonic welder may be integrated at a location between two discrete vacuum distributors (e.g., location of reduced material portions 3113); such that an ultrasonic welder 3200 may extend from a top surface of the vacuum tool 3100 through to the exterior plate surface 3158. Therefore, it is contemplated that any fastening tool (such as an ultrasonic welder) may extend through the top surface of the vacuum tool through the exterior plate 3158 at any location and at any orientation relative to the vacuum tool. As will be discussed in further detail with respect to FIG. 34, a biasing mechanism may also be implemented to allow portions of the vacuum tool 3100 to apply a greater compressive force than utilized by the ultrasonic welder 3200 (e.g., to provide stabilization of the parts to be welded).

Figure 26:
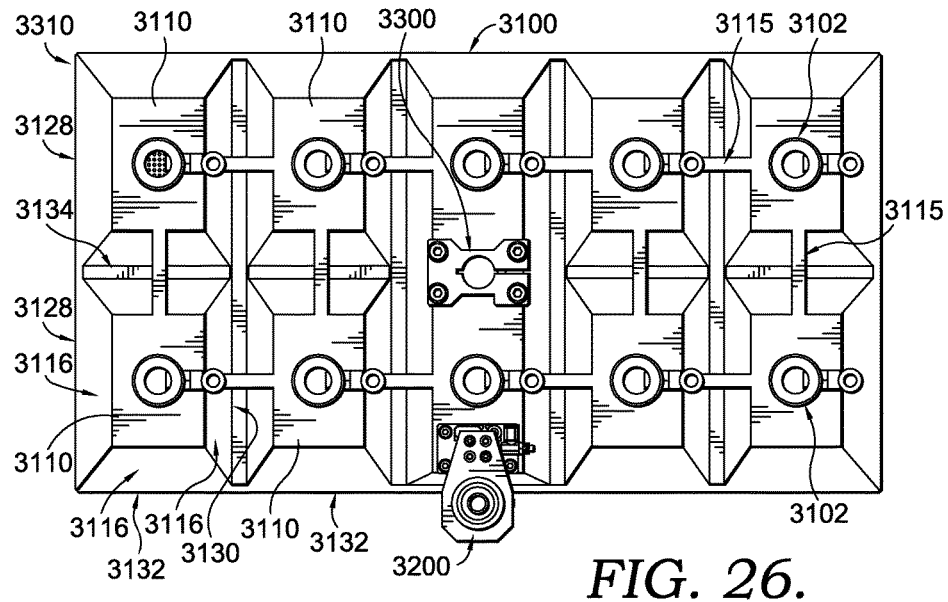
FIG. 26 depicts a top-down perspective view of the manufacturing tool previously depicted in FIG. 25, in accordance with aspects of the present invention.

FIG. 26 depicts a top-down view of the manufacturing tool 3310 previously depicted in FIG. 25, in accordance with aspects of the present invention. The top perspective of FIG. 26 provides an exemplary view of a potential orientation of a plurality of vacuum distributors 3110 to form a vacuum tool 3100. As will be discussed hereinafter with respect to FIG. 29, various vacuum generator 3102/vacuum distributor 3110 combinations may be selectively activated and/or deactivated to manipulate particular parts.

Figure 27:
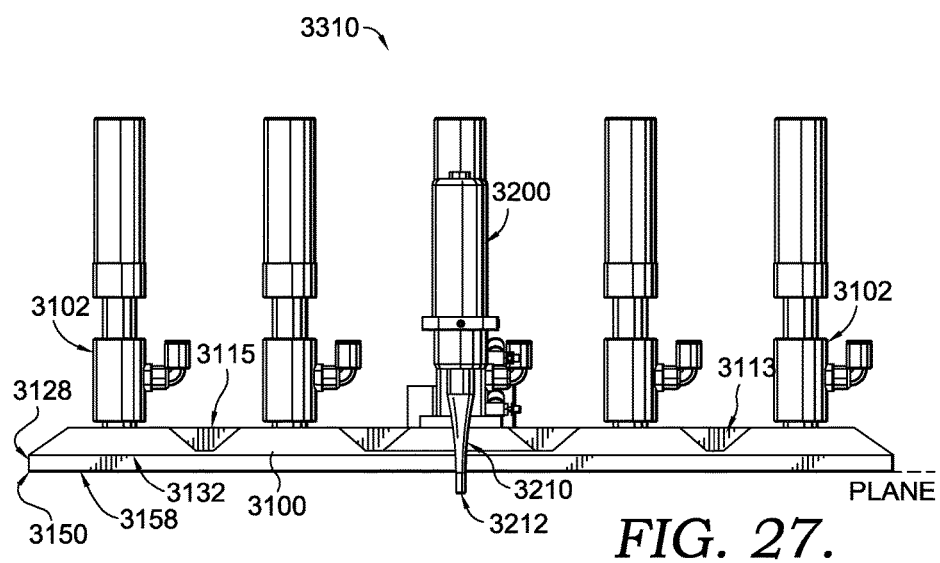
FIG. 27 depicts a side-perspective view of the manufacturing tool previously depicted in FIG. 25, in accordance with aspects of the present invention.

FIG. 27 depicts a side-perspective view of the manufacturing tool 3310 previously depicted in FIG. 25, in accordance with aspects of the present invention. The distal end 3212 of the horn 3210 extends below a plane defined by the exterior plate surface 3158. As a result of the distal end 3212 extending beyond the plane, the distal end 3212 may contact material without interference from the vacuum tool 3100 portion of the manufacturing tool 3310. However, it is contemplated that the distal end 3212 extends approximately even with the exterior plate surface 3158 plane. Further, it is contemplated that the distal end 3212 does not extend through the plane defined by the exterior plate surface 3158 plane. In this example, it is contemplated that the vacuum tool 3100 is moveably coupled to the coupling member allowing the exterior plate surface 3158 plane to move relative to the distal end 3212 (e.g., biasing mechanism, such as springs and/or pneumatics, may allow the exterior plate surface 3158 plane to move upwards once a sufficient pressure is applied to the exterior plate surface 3158). Further yet, it is contemplated that the distal end 3212 (and/or the ultrasonic welder 3200 in general) is oriented on the manufacturing tool 3310 such that a rotation about an axis by the positional member alters a material manipulating plane from that defined by the exterior plate surface 3158 plane to a plane defined by the distal end 3212 (e.g., the vacuum tool 3100 is rotated from being parallel to the materials being manipulated until the ultrasonic welder 3200 is perpendicular (or any acceptable angle) to the material to be welded). Stated differently, it is contemplated that instead of positioning the distal end 3212 in an appropriate location utilizing X-Y-Z movements, a rotation about an X-axis, Y-axis, and/or Z-axis may be implemented to position the distal end 3212.

Figure 28:
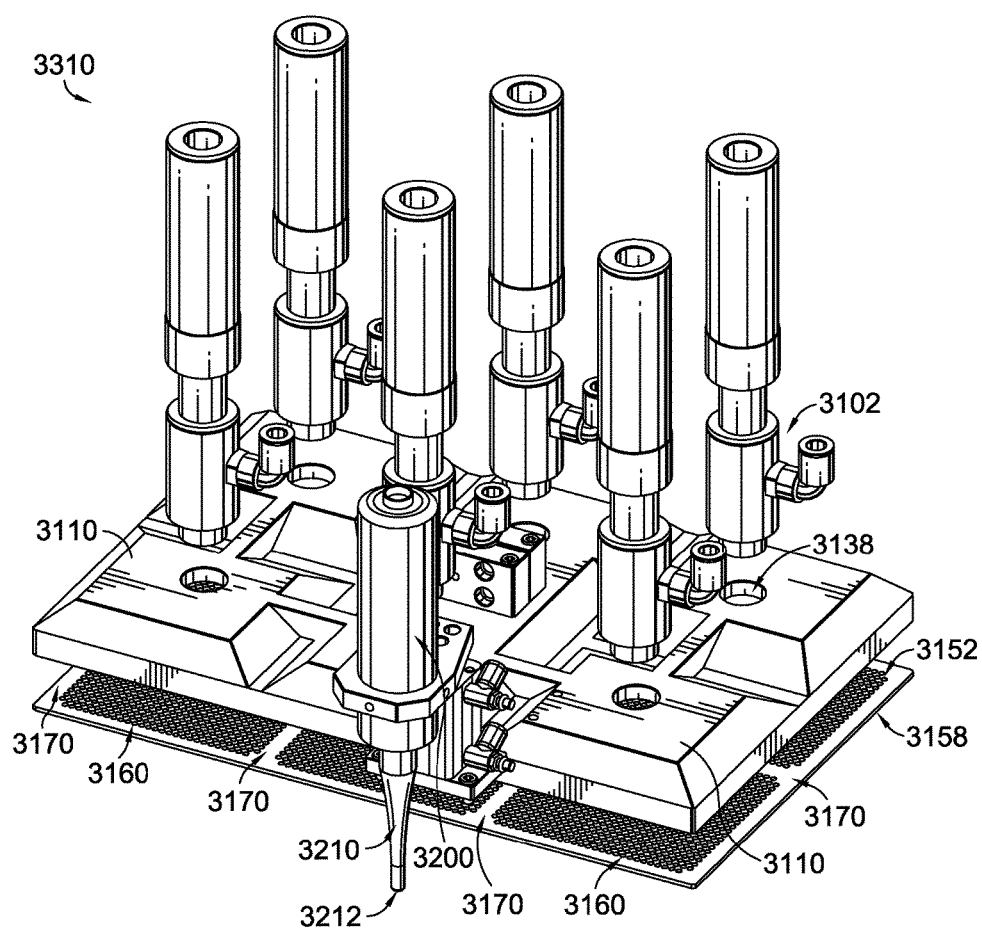
FIG. 28 depicts an exploded-perspective view of a manufacturing tool comprised of six discrete vacuum distributors, in accordance with aspects of the present invention.

FIG. 28 depicts an exploded-perspective view of a manufacturing tool 3310 comprised of six discrete vacuum distributors 3110, in accordance with aspects of the present invention. The plate 3150 is depicted in this exemplary aspect as having a plurality of apertures 3160 and non-aperture portions 3170. The non-aperture portion 3170 is a portion of the plate 3150 through which apertures do not extend. For example, along a segment where two vacuum distributors 3110 converge the plate 3150 may include a non-aperture portion 3170 to prevent cross feeding of vacuum between two associated vacuum distribution cavities 3140. Further, it is contemplated that non-aperture portion 3170 may extend along a segment in which the plate 3150 is bonded (temporarily or permanently) to one or more portions of the vacuum distributor(s) 3110. Further yet, it is contemplated that one or more non-aperture portions are integrated into the plate 3150 to further control the placement of vacuum forces as dispersed along the exterior plate surface 3158. Additionally, the non-aperture portion 3170 may be implemented in an area intended to be in contact with malleable (and other characteristics) portions of material that may not react well to the application of vacuum as transferred by one or more apertures.

Figure 29:
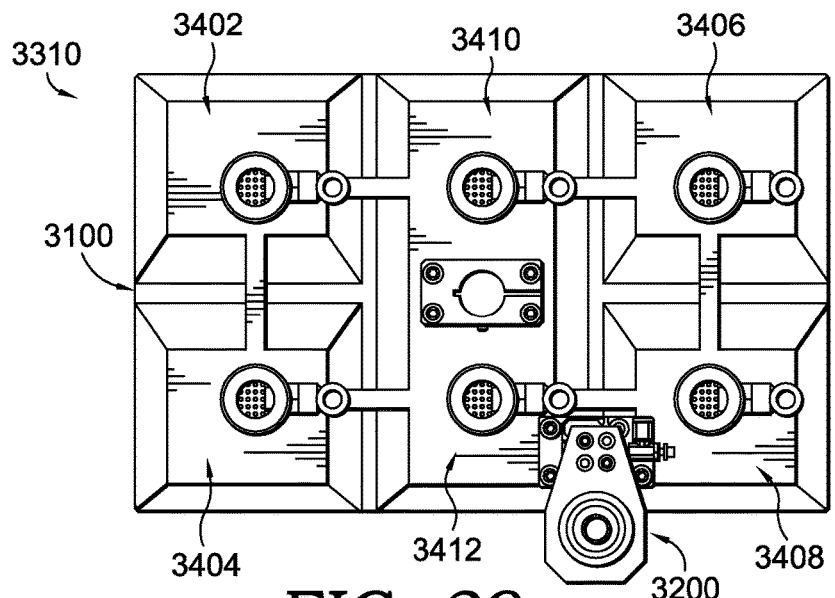
FIG. 29 depicts a top-down perspective of the manufacturing tool previously discussed with respect to FIG. 28, in accordance with exemplary aspects of the present invention.

FIG. 29 depicts a top-down perspective of the manufacturing tool 3310 previously discussed with respect to FIG. 28, in accordance with exemplary aspects of the present invention. In particular six discrete vacuum tool portions are identified as a first vacuum portion 3402, a second vacuum portion 3404, a third vacuum portion 3406, a fourth vacuum portion 3408, a fifth vacuum portion 3410, and a fifth vacuum portion 3412. In an exemplary aspect of the present invention, one or more vacuum portions may be selectively activated and deactivated. It is understood that this functionality may be applied to all aspects provided herein, but are only discussed with respect to the present FIG. 29 for brevity reasons.

Figure 30:
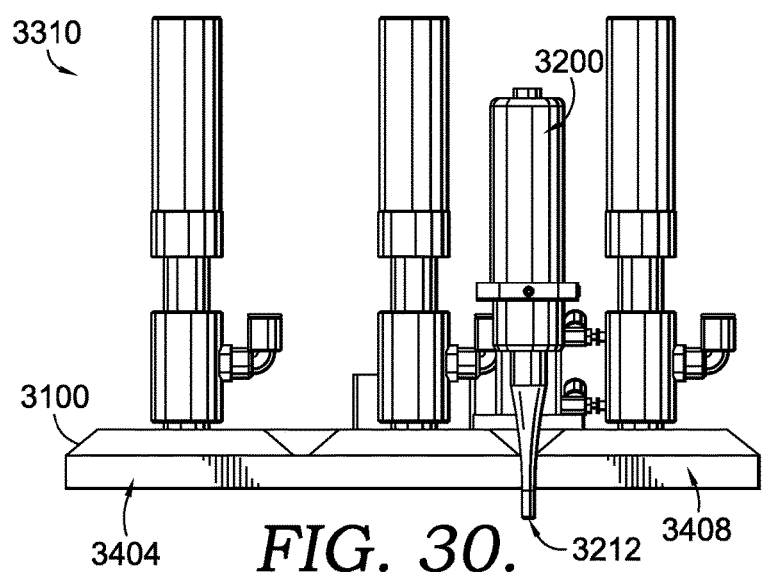
FIG. 30 depicts a side perspective of the manufacturing tool of FIG. 28, in accordance with aspects of the present invention.

FIG. 30 depicts a side perspective of the manufacturing tool 3310 of FIG. 28, in accordance with aspects of the present invention.

Figure 31:
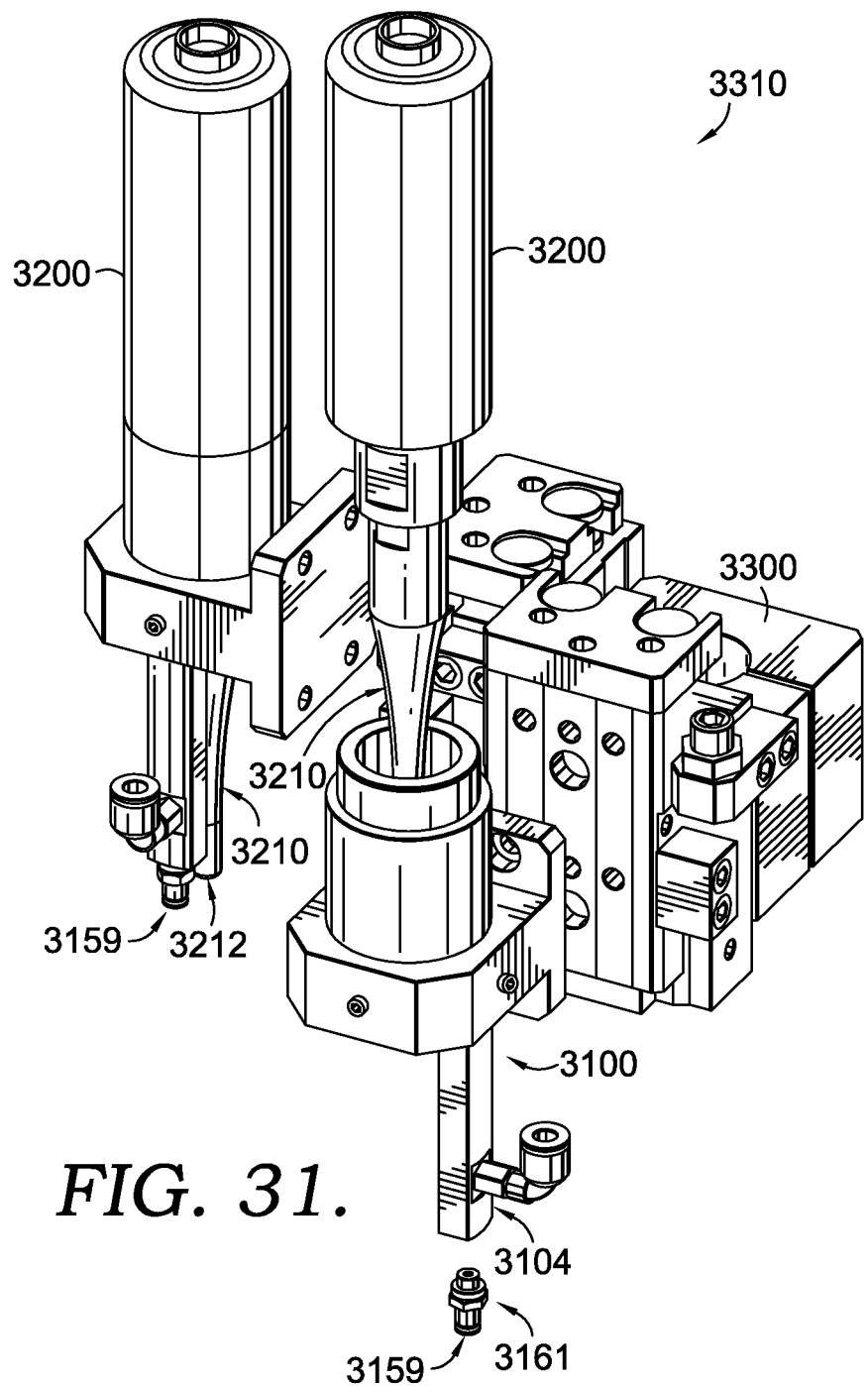
FIG. 31 depicts a manufacturing tool comprised of a vacuum generator and an ultrasonic welder, in accordance with aspects of the present invention.

FIG. 31 depicts a manufacturing tool 3310 comprised of a vacuum tool 3100 and an ultrasonic welder 3200, in accordance with aspects of the present invention. In particular, the vacuum tool 3100 of FIG. 31 is a venturi vacuum generator 3104. A venturi vacuum generator, similar to a coandă effect vacuum pump, utilizes pressurized air to generate a vacuum force. The vacuum tool 3100 of FIG. 31 differs from the vacuum tool 3100 of the previously discussed figures in that the vacuum tool 3100 of FIG. 31 utilizes a single aperture as opposed to a plate having a plurality of apertures. In an exemplary aspect, the concentration of vacuum force to a single aperture may allow for higher degree of concentrated part manipulation. For example, small parts that may not require even a whole single portion of a multi-portion vacuum tool to be activated may benefit from manipulation by the single aperture vacuum tool of FIG. 31. However, additional aspects contemplate utilizing a plate having a plurality of apertures that are not intended for contacting/covered-by a to-be manipulated part (e.g., resulting in a loss of suction that may traditionally be undesirable).

The single aperture vacuum tool of FIG. 31 utilizes a cup 3161 for transferring the vacuum force from the venturi vacuum generator 3104 to a manipulated part. The cup 3161 has a bottom surface 3159 that is adapted for contacting a part. For example, a surface finish, surface material, or size of the bottom surface may be suitable for contacting a part to be manipulated. The bottom surface 3159 may define a plane similar to the plane previously discussed as being defined from the exterior plate surface 3158 of FIG. 27, for example. As such, it is contemplated that the distal end 3212 of the ultrasonic welder 3200 may be defined relative to the plane of the bottom surface 3159.

It is contemplated that the cup 3161 may be adjusted based on a part to be manipulated. For example, if a part has a certain shape, porosity, density, and/or material, then a different cup 3161 may be utilized.

While two combinations of vacuum tool 3100 and ultrasonic welder 3200 are depicted as forming the manufacturing tool 3310 of FIG. 31, it is contemplated that any number of features may be implemented. For example, a plurality of vacuum tools 3100 may be utilized in conjunction with a single ultrasonic welder 3200. Similarly, it is contemplated that a plurality of ultrasonic welders 3200 may be implemented in conjunction with a single vacuum tool 3100. Further, it is contemplated that various types of vacuum tools may be implemented in conjunction. For example, a manufacturing tool 3310 may be comprised of a single aperture vacuum tool and a multi-aperture vacuum tool (e.g., FIG. 31). Further yet, it is contemplated that one or more single aperture vacuum tools are coupled with one or more multi-aperture vacuum tools and one or more fastening tools. As such, any number of features (e.g., tools) may be combined.

Figure 32:
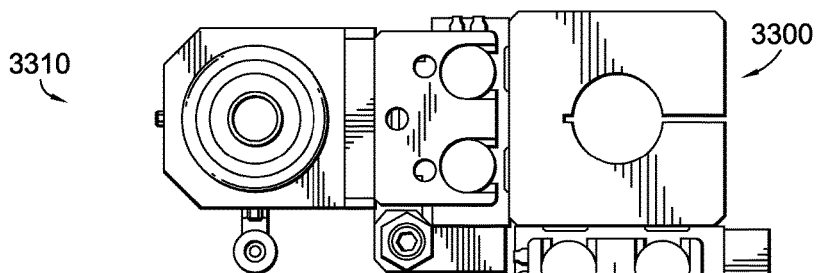
FIG. 32 depicts a top-down perspective of the manufacturing tool of FIG. 31, in accordance with aspects of the present invention.

FIG. 32 depicts a top-down perspective of the manufacturing tool of FIG. 31, in accordance with aspects of the present invention.

Figure 33:
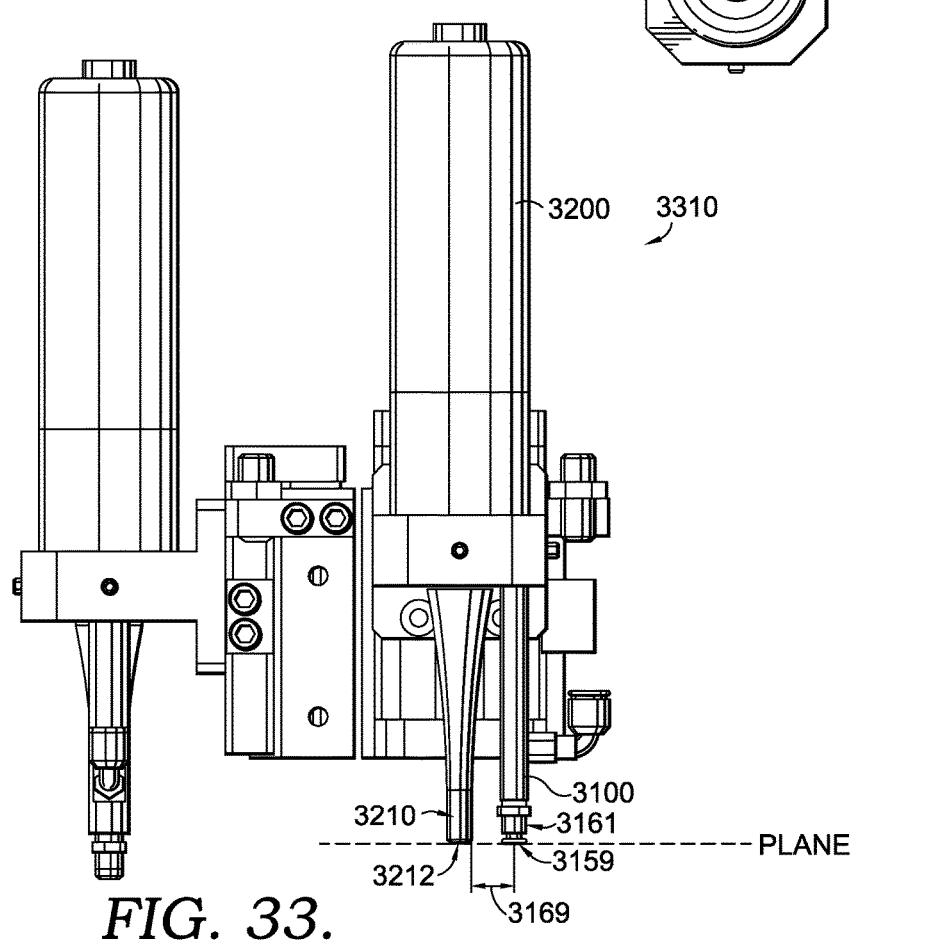
FIG. 33 depicts a side perspective of the manufacturing tool of FIG. 31, in accordance with aspects of the present invention.

FIG. 33 depicts a side perspective of the manufacturing tool of FIG. 31, in accordance with aspects of the present invention. An offset distance 3169 may be adjusted for the manufacturing tool 3310. The offset distance 3169 is a distance between the distal end 3212 of the ultrasonic welder 3200 and the cup 3161. In an exemplary aspect, the distance 3169 is minimized to reduce manufacturing tool 3310 travels from placing a part to welding the part. However, in another exemplary aspect, the distance 3169 is maintained sufficient distance to prevent interference in the manipulation or welding operations by the other tool portion.

Figure 34:
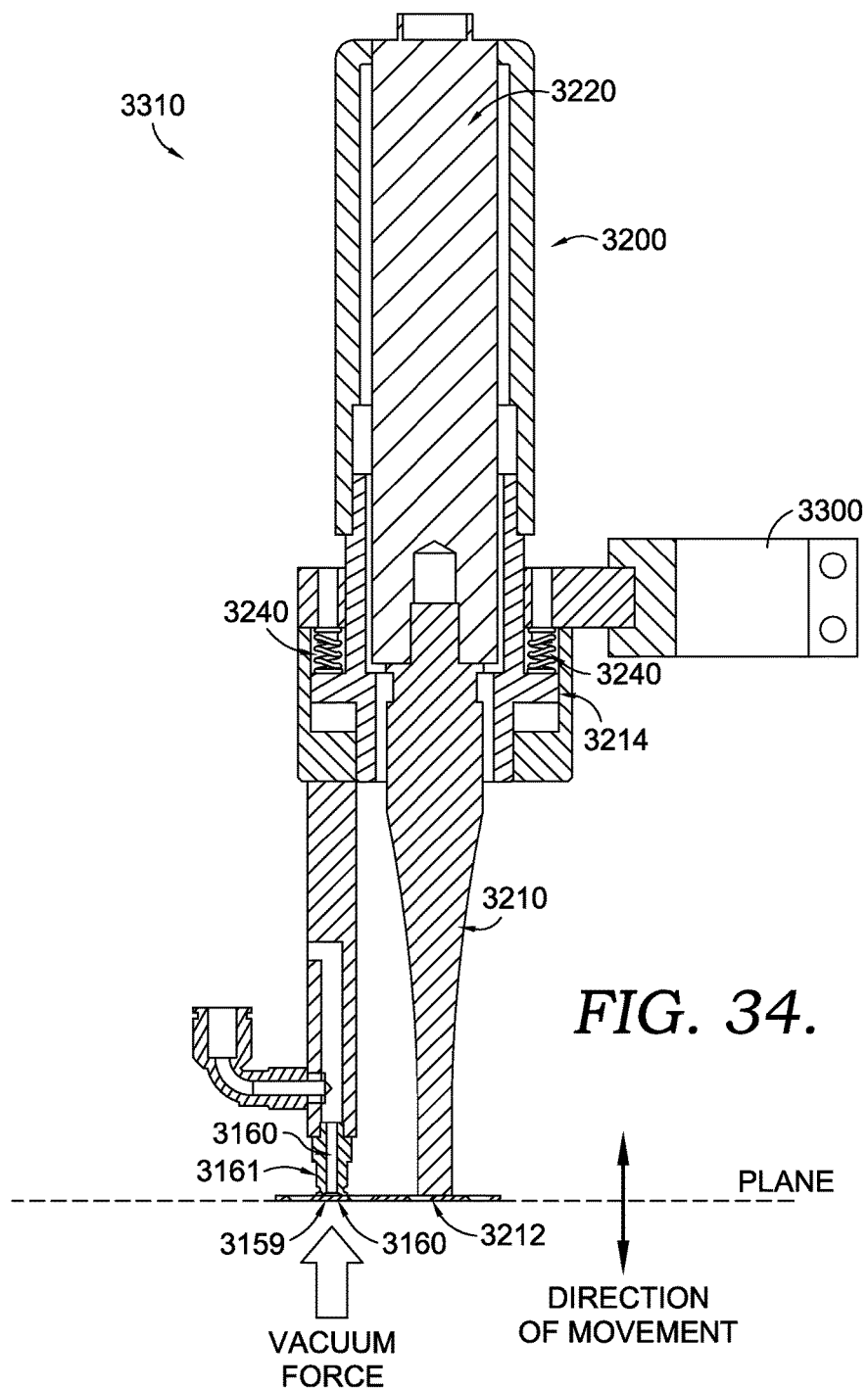
FIG. 34 depicts a cut side perspective view of a manufacturing tool comprised of a single aperture vacuum tool and an ultrasonic welder, in accordance with aspects of the present invention.

FIG. 34 depicts a cut side perspective view of a manufacturing tool 3310 comprised of a single aperture 3160 and an ultrasonic welder 3200, in accordance with aspects of the present invention. The manufacturing tool 3310 of FIG. 34 incorporates a moveable coupling mechanism by which the ultrasonic welder 3200 is allowed to slide in a direction perpendicular to a plane defined by the bottom surface 3159. To accomplish this exemplary moveable coupling, a biasing mechanism 3240 is implemented to regulate an amount of pressure the distal end 3212 exerts on a part, regardless of pressure being exerted in the same direction by way of the coupling member 3300. In this example a flange 3214 slides in a channel that is opposed by the biasing mechanism 3240. While a spring-type portion is illustrated as the biasing mechanism 3240, it is contemplated that any mechanism may be implemented (e.g., gravity, counter weight, pneumatic, hydraulic, compressive, tensile, springs, and the like).

In use, it is contemplated that a force may be exerted onto a part by the manufacturing tool 3310 that is greater than necessary for the welding of the part by the ultrasonic welder 3200. As a result, the greater force may be effective for maintaining a part during a welding operation, while the biasing mechanism 3240 may be used to apply an appropriate pressure force for a current welding operation. Further, it is contemplated that the biasing mechanism may also be used as a dampening mechanism to reduce impact forces experienced by one or more portions of the manufacturing tool 3310 when contacting objects (e.g., parts, work surface).

In use, it is contemplated that a force may be exerted onto a part by the manufacturing tool 3310 that is greater than necessary for the welding of the part by the ultrasonic welder 3200. As a result, the greater force may be effective for maintaining a part during a welding operation, while the biasing mechanism 3240 may be used to apply an appropriate pressure force for a current welding operation. For example, it is contemplated that the biasing mechanism 3240 may allow for movement of the distal end 3212 over a range of distances. For example, the range may include 1 mm to 10 mm, 3-6 mm, and/or about 5 mm. Further, it is contemplated that the biasing mechanism may also be used as a dampening mechanism to reduce impact forces experienced by one or more portions of the manufacturing tool 3310 when contacting objects (e.g., parts, work surface).

Further yet, it is contemplated that instead of (or in addition to) utilizing a biasing mechanism, an amount of force exerted by an ultrasonic welder 3200 (or any fastening device) may be adjusted based on the material to be bonded. For example, a determined percentage of compression may be allowed for the materials to be bonded such that an offset height of the distal end from the plate bottom surface may be adjusted to allow for the determined level of compression for particular materials. In practice, highly compressible material may allow for a greater distance between a distal end of the fastening tool and the bottom surface of the vacuum plate as compared to non-highly compressible materials that would not allow for the same amount of compression (measured by size or force).

Further, it is contemplated that the vacuum tool 3100 is alternatively or additionally implementing a biasing mechanism. For example, in an exemplary aspect of the present invention, the amount of pressure exerted by the vacuum tool 3100 may be desired to be less than a pressure exerted by the distal end 3212 on the part. As a result, a form of biasing mechanism 3240 may be employed to controllably exert pressure on to a part by the vacuum tool 3100.

An amount of force that may be exerted by a distal end having a biasing mechanism (or not having a biasing mechanism) may range from 350 grams to 2500 grams. For example, it is contemplated that the amount of force exerted by the distal end on a part may increase as an amount of distance traveled by a biasing mechanism increases. Therefore, a relationship (e.g., based on a coefficient of the biasing mechanism) may dictate an amount of pressure applied based on a distance traveled. In an exemplary operation, such as affixing a base material, a mesh material, and a skin during a welding operation, about 660 grams of force may be exerted. However, it is contemplated that more or less force may be utilized.

Figure 35:
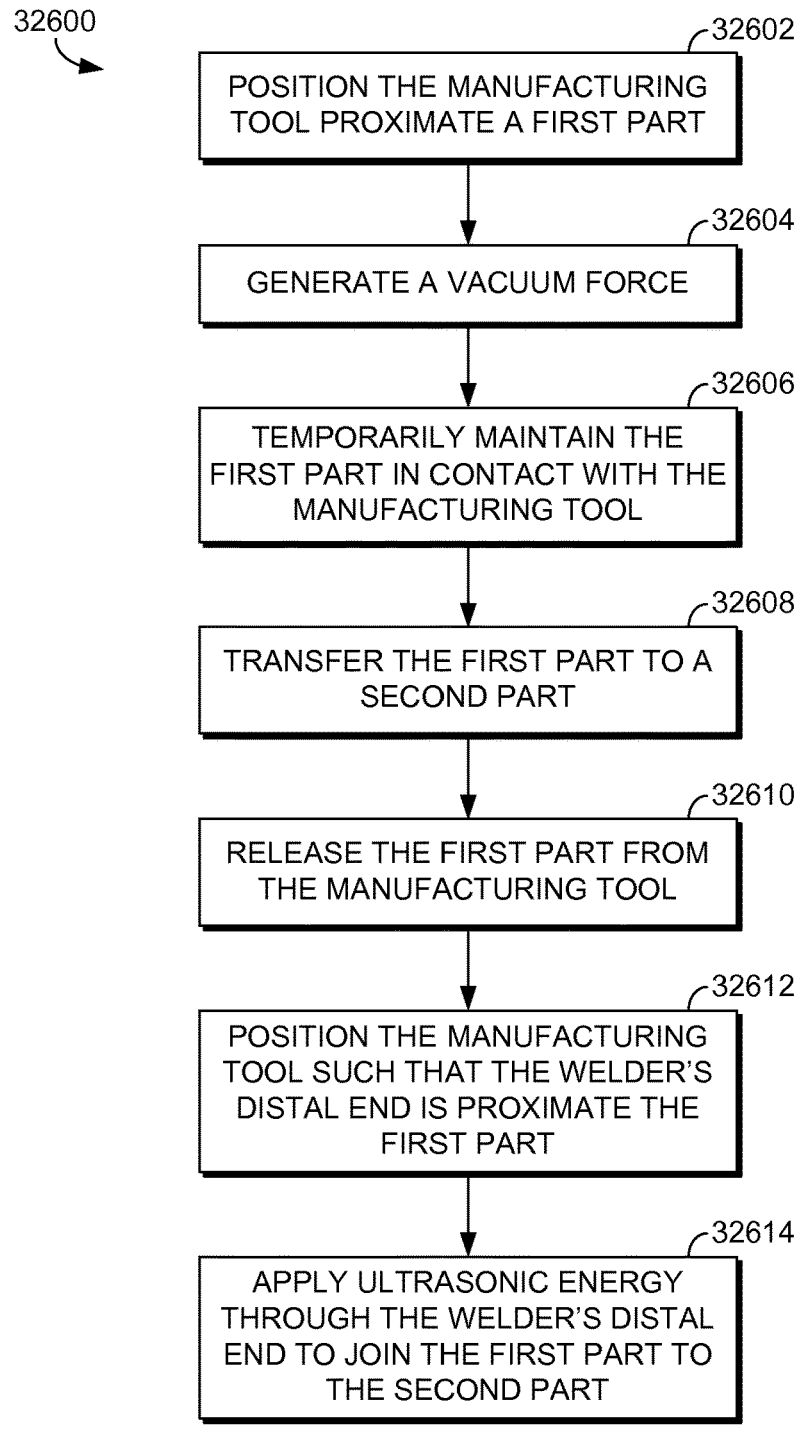
FIG. 35 depicts a method for joining a plurality of manufacturing parts utilizing a manufacturing tool comprised of a vacuum tool and an ultrasonic welder, in accordance with aspects of the present invention.

FIG. 35 depicts a method 32600 for joining a plurality of manufacturing parts utilizing a manufacturing tool 3310 comprised of a vacuum tool 3100 and an ultrasonic welder 3200, in accordance with aspects of the present invention. A block 32602 depicts a step of positioning the manufacturing tool 3310 such that the vacuum tool 3100 is proximate a first part. As used herein, the term proximate may refer to a physical relationship that includes being at, on, and near. For example, the manufacturing tool may be proximate a location when it is within a length or width of the manufacturing tool from the location. Further, it is contemplated that the manufacturing tool is proximate a location when the manufacturing tool is at a location defined to be within tolerance of the part to be manipulated. The positioning of the manufacturing tool 3310 may be accomplished by a positional member, previously discussed. In turn, the positional member may be in communication with a part-recognition system that directs the placement of the manufacturing tool based on image analysis of the first part.

A block 32604 depicts a step of generating a vacuum force transferred through a bottom surface of the vacuum tool 3100. For example, one or more of the vacuum generators 3102 may be activated (e.g., as a whole, selectively) to generate a vacuum force that results in a suction effect attracting a part to the exterior plate surface 3158 of FIG. 28 (or the bottom surface 3159 of FIG. 31). As previously discussed, it is contemplated that one or more vacuum portions may be selectively activated (or deactivated) depending on a desired amount of vacuum force and a desired location of vacuum force.

A block 32606 depicts a step of temporarily maintaining the first part in contact with at least a portion of the vacuum tool 3100. Therefore, once a vacuum is applied to a part and the part is attracted to the vacuum tool 3100, the part is maintained in contact with the vacuum tool 3100 so that if the vacuum tool moves (or an underlying supporting surface of the part moves) the part will stay with the vacuum tool. The term temporarily is utilized in this sense so as not to imply a permanent or otherwise significant bond that requires significant effort to separate the part from the vacuum tool. Instead, the part is "temporarily" maintained for the duration that a sufficient vacuum force is applied.

A block 32608 depicts a step of transferring the first part to a second part. The first part may be transferred though a movement of the manufacturing tool 3310. The movement of the manufacturing tool may be accomplished by a positional member, previously discussed. In turn, the positional member may be in communication with a part-recognition system that directs the transfer of the first part to the second part based on, for example, image analysis of the second part. Further, it is contemplated that the transferring of the first part may be accomplished through the movement of the second part to the first part (e.g., underlying conveyor system brings the second part towards the first part).

A block 32610 depicts a step of releasing the first part from the vacuum tool 3100. For example, it is contemplated that stopping the generation of vacuum pressure by one or more vacuum generators 3102 is sufficient to effectuate the release of the first part. Further, it is contemplated that a burst of air that is insufficient to generate a vacuum (e.g., insufficient to take advantage of a coandă effect) in the vacuum generator 3102, but sufficient to cause the release the part may be implemented.

Further, it is contemplated that the releasing of the first part further comprises activating another mechanism that opposes the vacuum pressure of the vacuum tool 3100. For example, a work surface (e.g., conveyor, table top) opposite of the vacuum tool 3100 may generate a vacuum pressure that counters the vacuum of the vacuum tool. This may allow for precise placement and maintaining of the part as the vacuum tool again transitions to a new position. The countering vacuum pressure may be generated with a mechanical vacuum (e.g., blower) as cycling off and on may not be needed at the same rate as the vacuum tool 3100.

In an exemplary aspect of the present invention, it is contemplated that a work surface vacuum and a vacuum tool vacuum may have the following on/off relationship for exemplary processes, as depicted in the following tables. While exemplary process are indicated, it is contemplated that additional processes may be substituted or re-arranged within the process. Further, a manufacturing surface, as used herein, reference to a moveable article that may form a base for initially securing, maintaining, aligning, or otherwise assisting in the manufacturing of a product resulting from the manipulated part(s).

Simplified Operations Table

| Operation | Work Surface Vacuum | Vacuum Tool Vacuum |
|---|---|---|
| Initial State | Off | Off |
| Manufacturing surface arrives | On | Off |
| Robot starts to move vacuum tool for part pickup | On | Off |
| Robot reaches X % distance from part | On | On |
| Robot begins moving vacuum tool with part to place the part | On | On |
| Place the part | On | Off |
| Affixing of part (e.g., welding) | On | Off |
| End state | On | Off |

Additional Operations Table

| Operation | Work Surface Vacuum | Vacuum Tool Vacuum |
|---|---|---|
| Initial State | Off | Off |
| Manufacturing surface arrives | On | Off |
| Robot starts to move vacuum tool for part pickup | On | Off |
| Robot reaches X % distance from part | On | On |
| Robot begins moving vacuum tool with part to place the part | On | On |
| Robot reaches Y % distance from the manufacturing surface | Off | On |
| Wait Z seconds | Off | On |
| Place the part | Off | Off |
| Robot begins moving | Off | Off |
| Robot positions welder | On | Off |
| Affixing of part (e.g., welding) | On | Off |
| End state | On | Off |

Consequently, it is contemplated that any combination of work surface vacuum and vacuum tool vacuum may be utilized to accomplish aspects of the present invention. In an exemplary aspect the work surface vacuum is maintained on while a manufacturing surface is present. As a result, the work surface vacuum may utilize a mechanical vacuum generator that may be more efficient, but requires a start up or wind down time than a coandă or a venturi vacuum generator. Further, a mechanical vacuum generator may be able to generate a greater amount of vacuum force over a larger area than the coandă or venturi vacuum generators typically generate.

A block 32612 depicts a step of positioning the manufacturing tool 3310 such that the distal end 3212 of the ultrasonic welder 3200 is proximate the first part. The positioning of the ultrasonic welder may be in response to instructions received from a part-recognition system as outlined above. In this example, it is contemplated that the first part and the second part are intended to be joined utilizing the ultrasonic welder 3200. Consequently, the ultrasonic welder is positioned in a manner to apply an ultrasonic induced bond between the first part and the second part. The ultrasonic induced bond may be temporary (i.e., for tacking purposes) or permanent.

A block 32614 depicts a step of applying an ultrasonic energy through the horn 3210. The application of ultrasonic energy bonds the first and the second part with an ultrasonic weld.

While various steps of the method 32600 have been identified, it is contemplated that additional or fewer steps may be implemented. Further, it is contemplated that the steps of method 32600 may be performed in any order and is not limited to the order presented.

Additional arrangements, features, combinations, sub-combination, steps, and the like are contemplated within the provided disclosure. As such, additional embodiments are inherently disclosed by the provided discussion.

What is claimed is:

1. A method for positioning and assembling shoe parts in an automated manner during a shoe-manufacturing process, the method comprising:
   receiving a first image depicting a two-dimensional representation of an attachment shoe part which is to be attached to a base shoe part;
   determining a first geometric coordinate in a geometric coordinate system of the attachment shoe part by analyzing the first image;

receiving a second image depicting a two-dimensional representation of the base shoe part;

determining a second geometric coordinate in the geometric coordinate system of the base shoe part by analyzing the second image; and transferring, by a pickup tool, the attachment shoe part from the first geometric coordinate to the second geometric coordinate.

2. The method of claim 1, wherein the two-dimensional representation of the attachment shoe part is comprised of a two-dimensional shape having a perimeter, wherein one or more pixel coordinates of the first image are associated with the perimeter, and wherein the method further comprises converting, by a computer processor, the one or more pixel coordinates to the first geometric coordinate.

3. The method of claim 1, further comprising determining the identity of the attachment shoe part by matching the first image to a reference image.

4. The method of claim 1, wherein the pickup tool further comprises a vacuum-powered part holder, and wherein transferring the attachment shoe part to the second geometric coordinate comprises utilizing the vacuum-powered part holder to transfer the attachment shoe part.

5. The method of claim 1, further comprising attaching the attachment shoe part to the base shoe part.

6. A method of positioning and joining a plurality of shoe parts using automated identification and a multi-functional manufacturing tool, the method comprising:

receiving a first image depicting a two-dimensional representation of an attachment shoe part which is to be attached to a base shoe part;

determining a first geometric coordinate of the attachment shoe part in a geometric coordinate system by analyzing the first image;

receiving a second image depicting a two-dimensional representation of the base shoe part;

determining a second geometric coordinate of the base shoe part in the geometric coordinate system by analyzing the second image; and transferring, using the multi-functional manufacturing tool, the attachment shoe part from the first geometric coordinate to the second geometric coordinate.

7. The method of claim 6, further comprising attaching the attachment shoe part to the base shoe part.

8. The method of claim 7, wherein attaching the attachment shoe part to the base shoe part comprises using an ultrasonic welding horn attached to the multi-functional manufacturing tool to attach the attachment shoe part to the base shoe part.

9. The method of claim 6, wherein determining the first geometric coordinate comprises determining pixel coordinates of the first image and converting the pixel coordinates to the first geometric coordinate.

10. The method of claim 6, wherein transferring the attachment shoe part to the second geometric coordinate comprises utilizing a vacuum-powered part holder attached to the multi-functional manufacturing tool to transfer the attachment shoe part.

11. A system that positions and attaches shoe parts in an automated manner during a shoe-manufacturing process, the system comprising:

at least one image recorder configured to record:
a first image depicting a two-dimensional representation of an attachment shoe part; and
a second image depicting a two-dimensional representation of a base shoe part; and one or more computer storage media having stored thereon computer-executable instructions that, when executed, cause a computing device to:
determine a first geometric coordinate of the attachment shoe part in a geometric coordinate system by analyzing the first image;
determine a second geometric coordinate of the base shoe part in the geometric coordinate system by analyzing the second image; and
instruct a manufacturing tool to transfer the attachment shoe part from the first geometric coordinate to the second geometric coordinate for attachment to the base shoe part.

12. The system of claim 11, further comprising the manufacturing tool, the manufacturing tool adapted to transfer the attachment shoe part to the base shoe part for attachment.

13. The system of claim 11, wherein the at least one image recorder comprises at least one first camera that records the first image and at least one second camera that records the second image.

14. The system of claim 11, wherein the manufacturing tool comprises at least a vacuum-powered part holder having a bottom surface adapted for contacting the attachment shoe part.

15. The system of claim 14, wherein the vacuum-powered part holder is comprised of a vacuum plate having a plurality of apertures extending through the vacuum plate.

16. The system of claim 14, wherein the vacuum-powered part holder is comprised of a vacuum plate having a single aperture extending through the vacuum plate.

17. The system of claim 14, wherein the manufacturing tool further comprises at least an ultrasonic-welding horn coupled to the vacuum-powered part holder.

18. The system of claim 17, wherein the ultrasonic-welding horn comprises at least a distal end adapted for contacting the attachment shoe part such that the distal end extends at least to a plane defined by the bottom surface of the vacuum-powered part holder.

19. The system of claim 17, wherein only one of the vacuum-powered part holder and the ultrasonic-welding horn is useable for a respective intended purpose at one time.

20. The system of claim 17, wherein both the vacuum-powered part holder and the ultrasonic-welding horn are useable for a respective intended purpose at one time.

* * * * *

UNITED STATES PATENT AND TRADEMARK OFFICE
CERTIFICATE OF CORRECTION

PATENT NO. : 10,194,716 B2
APPLICATION NO. : 14/803347
DATED : February 5, 2019
INVENTOR(S) : Patrick Conall Regan et al.

It is certified that error appears in the above-identified patent and that said Letters Patent is hereby corrected as shown below:

On the Title Page

Page 3, item [56], Column 2, Line 42: delete "Mon-" and replace with --Non- --.

In the Specification

Column 2, Line 30: delete "part" and replace with --part.--.
Column 10, Line 42: delete "0)" and replace with --Θ)--.
Column 11, Line 26: delete "512" and replace with --512.--.

Signed and Sealed this
Second Day of April, 2019

Andrei Iancu
*Director of the United States Patent and Trademark Office*